US011977707B2

(12) United States Patent
Niwa et al.

(10) Patent No.: US 11,977,707 B2
(45) Date of Patent: May 7, 2024

(54) TOUCH SENSOR

(71) Applicant: Panasonic Intellectual Property Management Co., Ltd., Osaka (JP)

(72) Inventors: Hiromitsu Niwa, Osaka (JP); Kota Araki, Osaka (JP); Akihiro Yamamura, Osaka (JP); Hiroaki Nishiono, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/252,013

(22) PCT Filed: Oct. 18, 2021

(86) PCT No.: PCT/JP2021/038416
§ 371 (c)(1),
(2) Date: May 5, 2023

(87) PCT Pub. No.: WO2022/107526
PCT Pub. Date: May 27, 2022

(65) Prior Publication Data
US 2024/0012526 A1 Jan. 11, 2024

(30) Foreign Application Priority Data

Nov. 20, 2020 (JP) ................................. 2020-193574

(51) Int. Cl.
*G06F 3/044* (2006.01)
(52) U.S. Cl.
CPC .................. *G06F 3/0446* (2019.05)
(58) Field of Classification Search
CPC ......... G06F 3/0446; G06F 3/041; G06F 3/044
See application file for complete search history.

(56) References Cited

U.S. PATENT DOCUMENTS

2014/0299357 A1* 10/2014 Nakamura .......... G06F 3/04164
174/250
2015/0002464 A1 1/2015 Nishioka et al.

FOREIGN PATENT DOCUMENTS

| JP | H04-031231 U1 | 3/1992 |
| JP | 2545233 Y | 8/1997 |
| JP | 2015-156232 A | 8/2015 |
| JP | 2017-227983 A | 12/2017 |
| JP | 2019-101981 A | 6/2019 |

OTHER PUBLICATIONS

International Search Report dated Dec. 14, 2021 in International Patent Application No. PCT/JP2021/038416, with English translation.

* cited by examiner

*Primary Examiner* — Deeprose Subedi
(74) *Attorney, Agent, or Firm* — Rimon P.C.

(57) ABSTRACT

Each of first electrode sections forming a transmission electrode includes a first main line and a plurality of first auxiliary lines. Each of second electrode sections forming a reception electrode includes a second main line and a plurality of second auxiliary lines. With the transmission and reception electrodes and overlapping each other, the first main line and the second main line intersect with each other at one point, and a cell region is unclosed. The cell region is surrounded by two or more types of thin wires selected from a group consisting of the first main line, the first auxiliary lines, the second main line, and the second auxiliary lines.

10 Claims, 17 Drawing Sheets

FIG.1
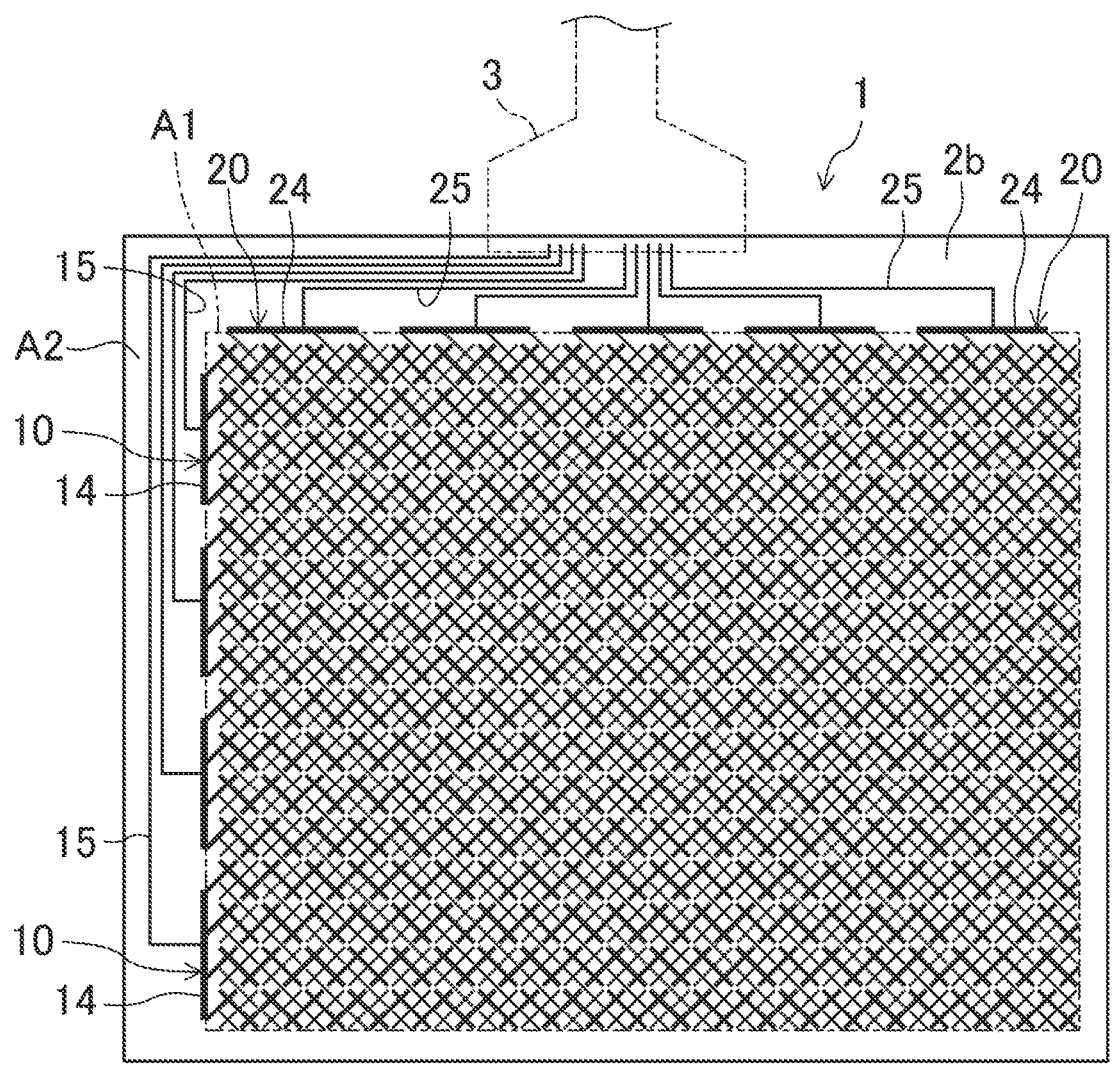
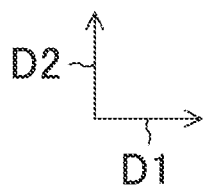

FIG.2
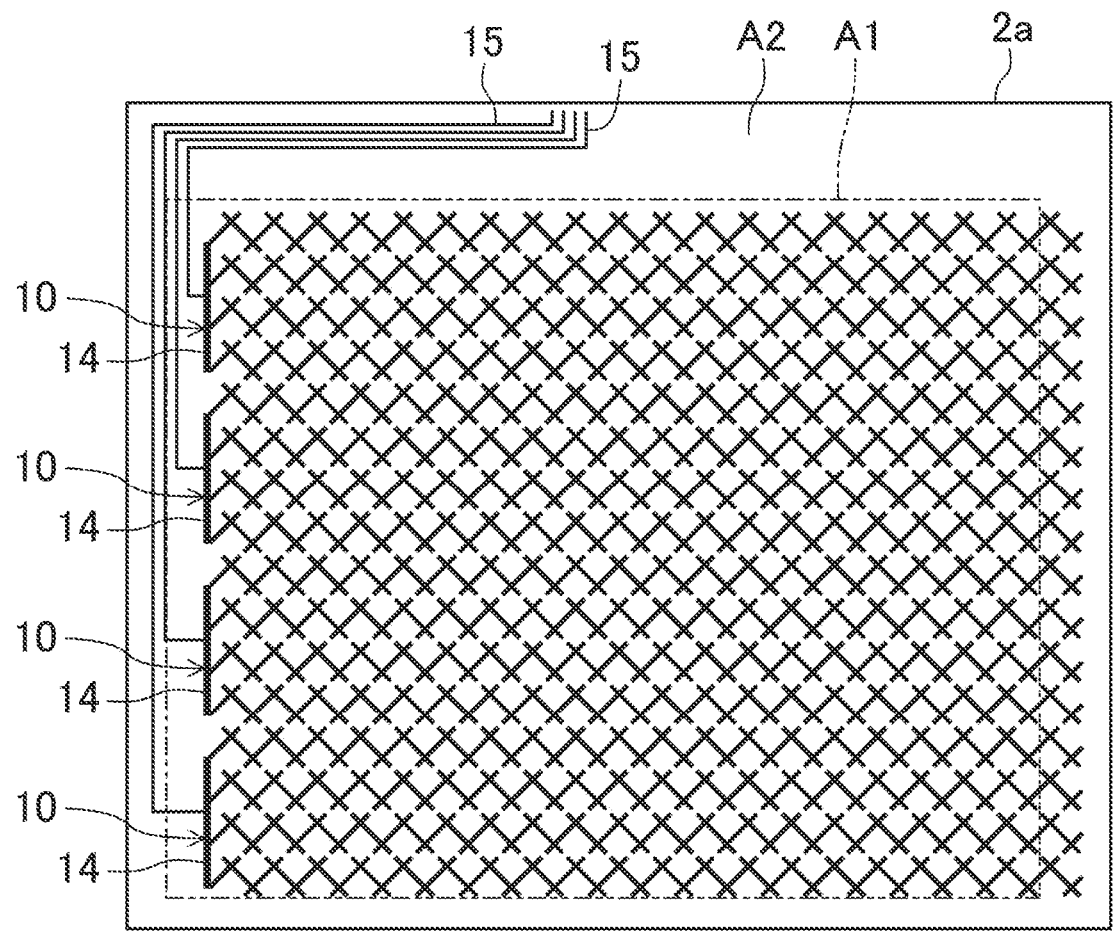
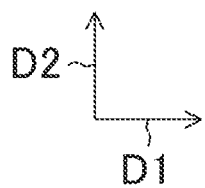

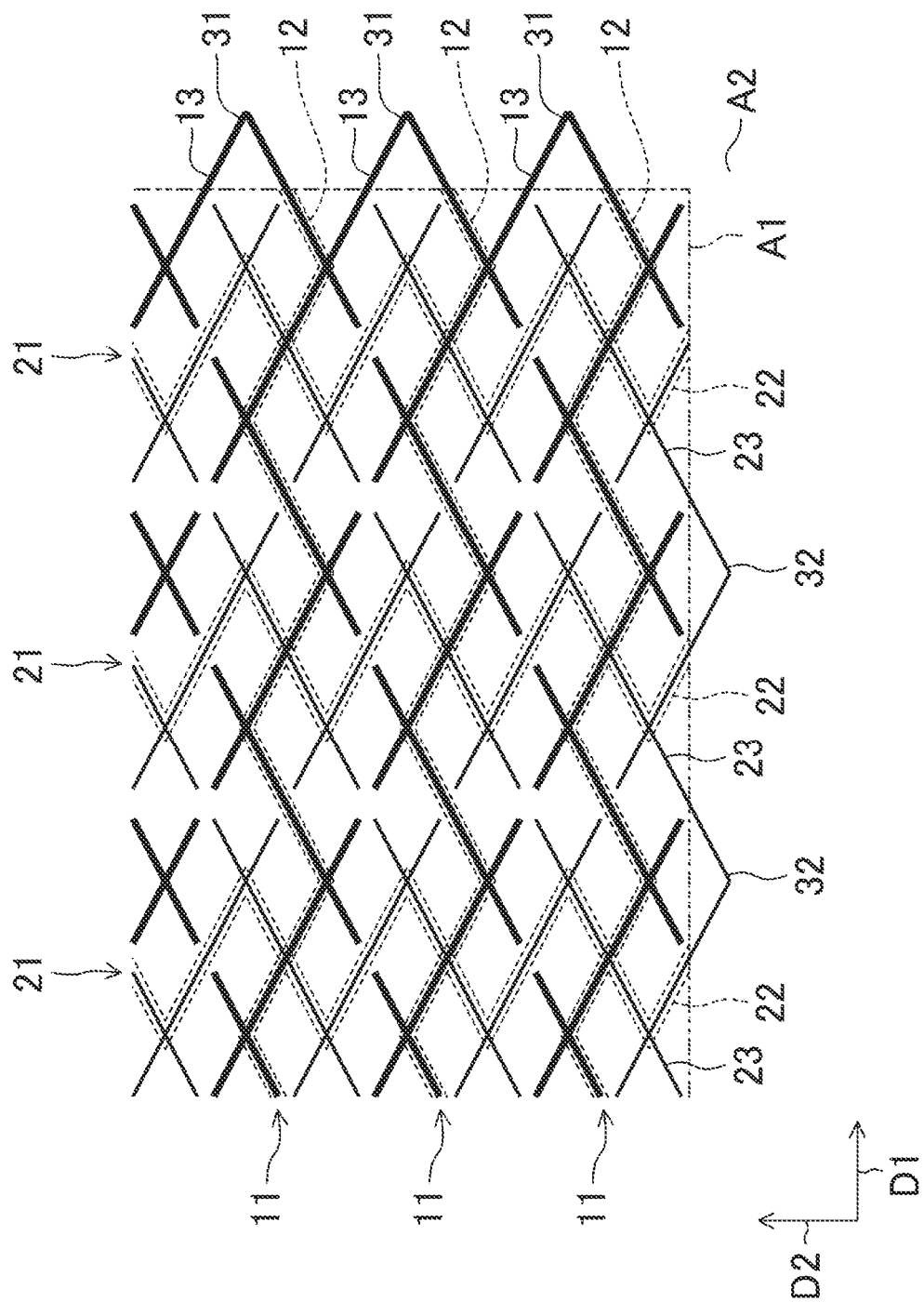

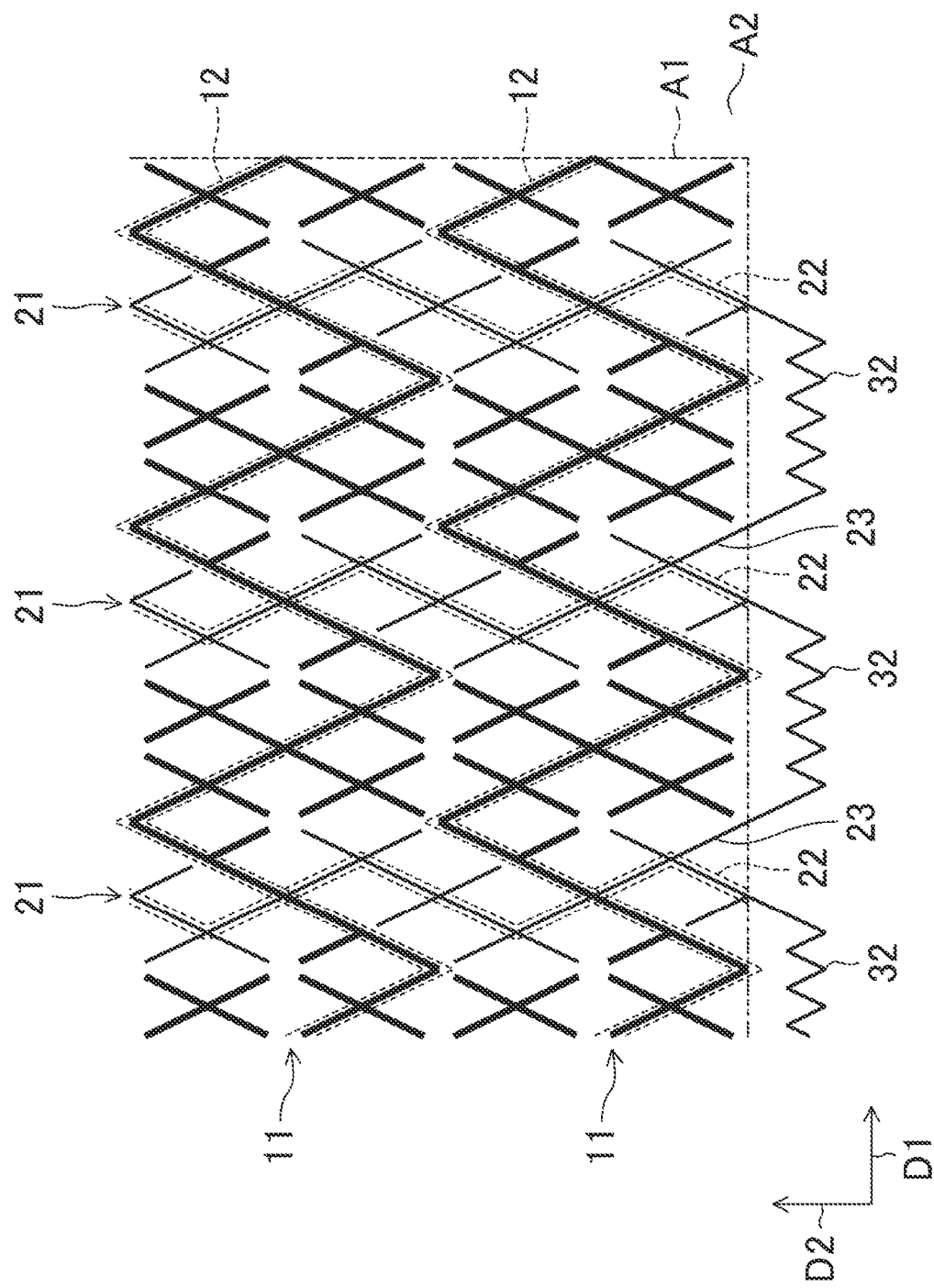

TOUCH SENSOR

CROSS-REFERENCE OF RELATED APPLICATIONS

This application is the U.S. National Phase under 35 U.S.C. § 371 of International Patent Application No. PCT/JP2021/038416, filed on Oct. 18, 2021, which in turn claims the benefit of Japanese Patent Application No. 2020-193574, filed on Nov. 20, 2020, the entire disclosures of which Applications are incorporated by reference herein.

TECHNICAL FIELD

The present disclosure relates to a touch sensor.

BACKGROUND ART

As capacitive touch sensors allowing a touch operation, for example, those disclosed in Patent Documents 1 and 2 are typically known.

Patent Document 1 discloses a key input device including a liquid crystal display panel (liquid crystal display) and a panel switch (touch sensor) above the liquid crystal display panel. The panel switch includes a lower substrate closer to the liquid crystal display panel and an upper substrate above the lower substrate. The lower substrate has an upper surface with a plurality of thin metals extending in a first direction. The upper substrate has a lower surface with a plurality of thin metals extending in a second direction.

Patent Document 2 discloses a capacitive touch sensor including a display panel and a touch sensor electrode above the display panel. This touch sensor electrode includes a lower substrate closer to the display panel and an upper substrate above the lower substrate. The lower substrate has an upper surface with a plurality of drive electrodes extending in the second direction. The upper substrate has an upper surface with a plurality of sensing electrodes extending in the first direction.

Each of the drive electrodes includes a plurality of drive grids. Each drive grid is formed into a closed square shape including a plurality of drive electrode lines extending in a first intersecting direction, and a plurality of drive electrode lines extending in a second intersecting direction. Note that the first intersecting direction intersects the first and second directions described above, while the second intersecting direction is orthogonal to the first intersecting direction.

Each of the sensing electrodes includes a plurality of sensing grids. Each sensing grid is in a closed square shape including a plurality of sensing electrode lines extending in the first intersecting direction, and a plurality of sensing electrode lines extending in the second intersecting direction.

CITATION LIST

Patent Documents

Patent Document 1: Japanese Unexamined Utility Model Publication No. H04-31231
Patent Document 2: Japanese Unexamined Patent Publication No. 2017-227983

SUMMARY OF THE INVENTION

Technical Problems

In a typical touch sensor as in Patent Document 1, there arises a problem in that the visibility of moiré is affected by the interference of the liquid crystal display with a pixel array pattern. The pixel array pattern of the display refers to, for example, an array pattern of RGB (i.e., red, green, and blue) color filters or a black matrix which is an inverted pattern thereof. For example, if the plurality of thin metals on each substrate overlap the black matrix, the spatial frequency has a larger amplitude due to the interference. This results in the occurrence of moiré which adversely affects the visibility of the touch sensor. In order to reduce the moiré, further reduction in the widths of the metal wires to reduce the amplitude of the spatial frequency is effective. Further reduction in the width of each thin metal is, however, difficult in terms of manufacturing. In addition, with the further reduced width, each thin metal has a relatively higher resistance value. A higher resistance value hinders an increase in the size of a touch sensor.

On the other hand, in another typical touch sensor as in Patent Document 2, the drive and sensing electrode lines described above extend in the directions intersecting the black matrix of the liquid crystal display, which causes less moiré and enables to easily obtain excellent visibility. However, each square grid has four intersections between the thin metals. With the drive and sensing electrodes overlapping each other, there are more intersections between each drive grid and a corresponding one of sensing grids. Accordingly, the coupling capacitance between the thin metals disadvantageously increases.

In order to suppress increase in this coupling capacitance, it is effective to reduce the total number of grids and to increase the interval between the thin metals (enlarging the outer shape of each grid), thereby enabling reduction in the coupling capacitance of the touch sensor as a whole. However, with larger outer shapes of the drive and sensing grids, the operation screen has an uneven display when viewed by a user from the viewing side of the touch sensor. The thin metals forming the drive and sensing grids become easily visible through the operation screen of the touch sensor. That is, the visibility of the touch sensor is adversely affected. In addition, with larger outer shapes of the drive and sensing grids, variation in the sensitivity increases depending on a touch point when the user operates the touch sensor, resulting in a deterioration of the location accuracy.

The present disclosure has been made in view of the problems. It is an objective of the present disclosure to improve the accuracy in detecting a touch point, while providing excellent visibility and causing less increase in a coupling capacitance.

Solutions to the Problems

In order to achieve the objective, a touch sensor according to an aspect of the present disclosure is of a capacitive type with an active area. The touch sensor includes: a plurality of transmission electrodes that are arranged in the active area and extend in a first direction; and a plurality of reception electrodes that are arranged in the active area and extend in a second direction orthogonal to the first direction. Each of the plurality of transmission electrodes includes a plurality of first electrode sections that are each formed of a thin wire. Each of the plurality of first electrode sections includes: a first main line extending in a zigzag manner in the first direction; and a plurality of first auxiliary lines branching off from the first main line in a direction intersecting the first direction and the second direction. Each of the plurality of reception electrodes includes a plurality of second electrode sections that are each formed of a thin wire. Each of the plurality of second electrode sections includes: a second main line extending in a zigzag manner in the second direction; and a plurality of second auxiliary lines branching off from the second main line in a direction intersecting the first direction and the second direction. With the plurality of transmission electrodes and the plurality of reception electrodes overlapping each other, the first main line and the second main line intersect with each other at one point, and a cell region is unclosed. The cell region is surrounded by two or more types of thin wires selected from a group consisting of the first main line, the plurality of first auxiliary lines, the second main line, and the plurality of second auxiliary lines.

Advantages of the Invention

The present disclosure improves the accuracy in detecting a touch point, while providing excellent visibility and suppressing increase in a coupling capacitance.

BRIEF DESCRIPTION OF THE DRAWINGS

FIG. 1 is a plan view of a touch sensor of a first embodiment.

FIG. 2 is a plan view showing configurations of a lower substrate, a plurality of transmission electrodes, and a plurality of first leads.

FIG. 16 is a partially enlarged view showing a lower right of a touch sensor of a second embodiment.

FIG. 17 is a partially enlarged view corresponding to FIG. 16 and showing the right of a touch sensor of a variation of the second embodiment.

DESCRIPTION OF EMBODIMENTS

Embodiments of the present disclosure will be described below with reference to the drawings. The following description of the embodiments is merely exemplary in nature and is not intended to limit the present disclosure, its application, or its uses.

First Embodiment

FIG. 1 shows an overall configuration of a touch sensor 1 of a first embodiment of the present disclosure. The touch sensor 1 is a capacitive sensing input device on which a touch operation may be performed. The touch sensor 1 is used as an input device for, for example, an in-vehicle device such as a car navigation system, a display device of a personal computer, a mobile phone, a portable information terminal, a portable game machine, a copying machine, a ticket vending machine, an automatic teller machine, or a clock. Note that the touch sensor 1 is provided with a liquid crystal display (LCD) (not shown) on the back thereof (under a lower substrate 2a which will be described later).

In the following description, the term "first direction D1" means the direction extending from the left to the right on the plane of the drawings, whereas the term "second direction D2" means the direction extending from the bottom to the top on the plane of the drawings. In FIGS. 1 to 7, first main lines 12 and first auxiliary lines 13, which will be described later, are illustrated to be thicker than second main lines 22 and second auxiliary lines 23, which will be described later, for the sake of simplicity.

(Lower and Upper Substrates)

Figure 3:
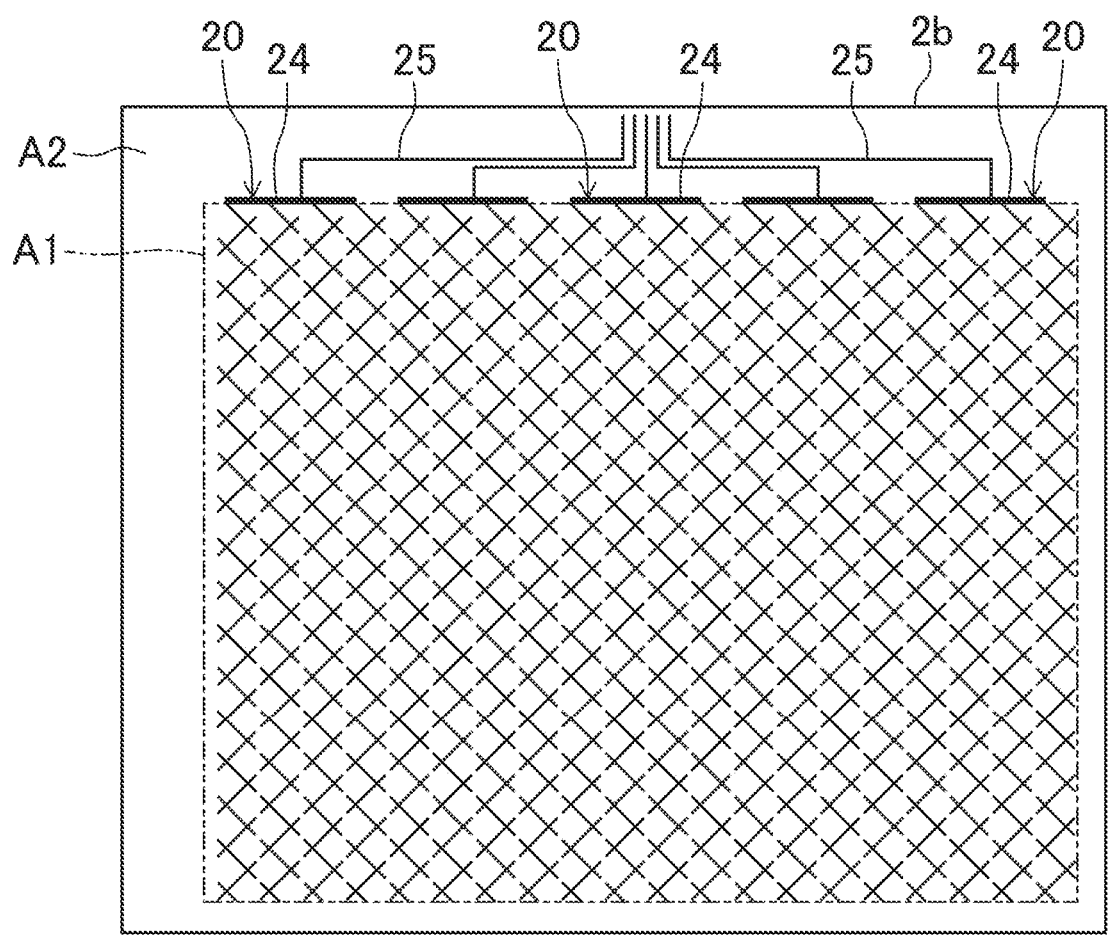
FIG. 3 is a plan view showing configurations of an upper substrate, a plurality of reception electrodes, and a plurality of second leads.

As shown in FIGS. 1 to 3, the touch sensor 1 includes the lower substrate 2a and an upper substrate 2b. The lower and upper substrates 2a and 2b are in a rectangular shape in a plan view. Each of the lower and upper substrates 2a and 2b has a groove (not shown) on the upper surface thereof. This groove is for embedding an electrical conducting material of thin wires which will be described later.

The lower and upper substrates 2a and 2b are made of a transparent resin material. Examples of the transparent resin material include resin materials such as polyethylene terephthalate (PET), polycarbonate, cycloolefin polymer (COP), and cycloolefin copolymer (COC).

Each of the lower and upper substrates 2a and 2b has an active area A1 and an inactive area A2. In the active area A1, the position of an external conductor, such as a user's finger or a touch pen (not shown), is detectable. The active area A1 is substantially in a rectangular shape in a plan view. The inactive area A2 is an outer region other than the active area A1 in a plan view.

The upper substrate 2b is stacked on the lower surface of a cover member (not shown), for example, with an adhesive layer (not shown) interposed therebetween. The lower substrate 2a is stacked on the lower surface of the upper substrate 2b with an adhesive layer (not shown) interposed therebetween. Here, the cover member is a cover glass or a plastic cover lens, for example. The adhesive layer is made of, for example, an optical clear adhesive (OCA) that is optically transparent.

(Flexible Wiring Board)

As shown in FIG. 1, the touch sensor 1 includes a flexible wiring board 3. The flexible wiring board 3 is flexible and has electrical characteristics unchanged even in a deformed state. The flexible wiring board 3 is made of a flexible insulating film such as polyimide (PI), polyethylene terephthalate (PET), or polyethylene naphthalate (PEN). The flexible wiring board 3 is electrically connected to a plurality of first leads 15 and a plurality of second leads 25, which will be described later, while being fixed to the lower and upper substrates 2a and 2b by an anisotropic conductive adhesive.

(Transmission and Reception Electrodes)

As shown in FIGS. 1 to 3, the touch sensor 1 includes a plurality of capacitive transmission and reception electrodes 10 and 20.

As shown in FIG. 1, the transmission and reception electrodes 10 and 20 are arranged in the active area A1. The touch sensor 1 detects a touch operation by a user's finger (i.e., a detection target) touching the operation screen (not shown) through the transmission and reception electrodes 10 and 20 in the active area A1. The transmission and reception electrodes 10 and 20 are insulated from each other with the upper substrate 2b interposed therebetween. In the embodiments, the width of the transmission electrodes 10 in the second direction D2 is the same as the width of the reception electrodes 20 in the first direction D1.

As shown in FIG. 2, the transmission electrodes 10 are arranged on the upper surface of the lower substrate 2a. The transmission electrodes 10 are connected to a drive circuit in a control circuit (not shown) via the flexible wiring board 3. This drive circuit allows each transmission electrode 10 to radiate an electric field to the vicinity. The transmission electrodes 10 extend in the first direction D1. The transmission electrodes 10 are aligned in the second direction D2.

As shown in FIG. 3, the reception electrodes 20 are arranged on the upper surface of the upper substrate 2b. The reception electrodes 20 receive the electric fields radiated from the transmission electrodes 10. The reception electrodes 20 extend in the second direction D2. The reception electrodes 20 are aligned at an interval in the first direction D1. The reception electrodes 20 are connected to a detection circuit (not shown) in the control circuit described above via the flexible wiring board 3.

(First Electrode Section)

Figure 4:
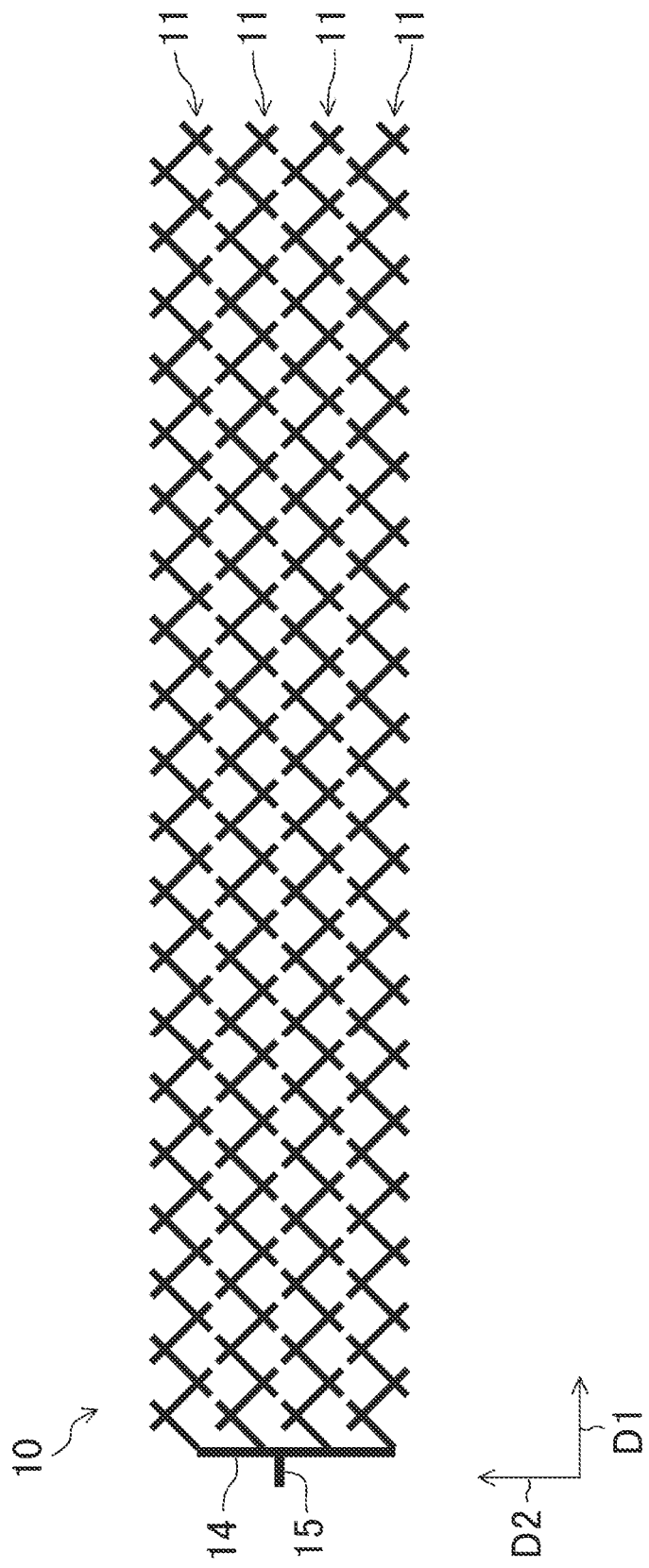
FIG. 4 is an enlarged view schematically showing some of the first electrode sections taken out of FIG. 2.

As shown in FIG. 4, each of the transmission electrodes 10 includes a plurality of (four in the shown example) first electrode sections 11. The first electrode sections 11 are electrically connected to each other by a first-electrode terminal 14 which will be described later. Each of the first electrode sections 11 includes a plurality of thin wires.

The thin wires are electrically conductive. Specifically, the thin wires are made of, for example, an electrical conducting material embedded in the groove (not shown) of the upper surface of the lower substrate 2a. Suitable as this electrical conducting material is electrically conductive metal. Specifically, copper, silver, or a copper alloy is suitable as a material of the electrically conductive metal. The thin wires have a width of several μm, for example. The thin wires forming the first main lines 12 and the first auxiliary lines 13 have a width preferably set within a range from 0.5 μm to 4.0 μm. The width is more preferably set within a range from 0.5 μm to 3.0 μm. The width is particularly preferably set within a range from 0.5 μm to 2.0 μm. Note that an electrically conductive resin or any suitable substance may be used as the electrical conducting material in addition to the electrically conductive metal.

(First Main Line)

Figure 6:
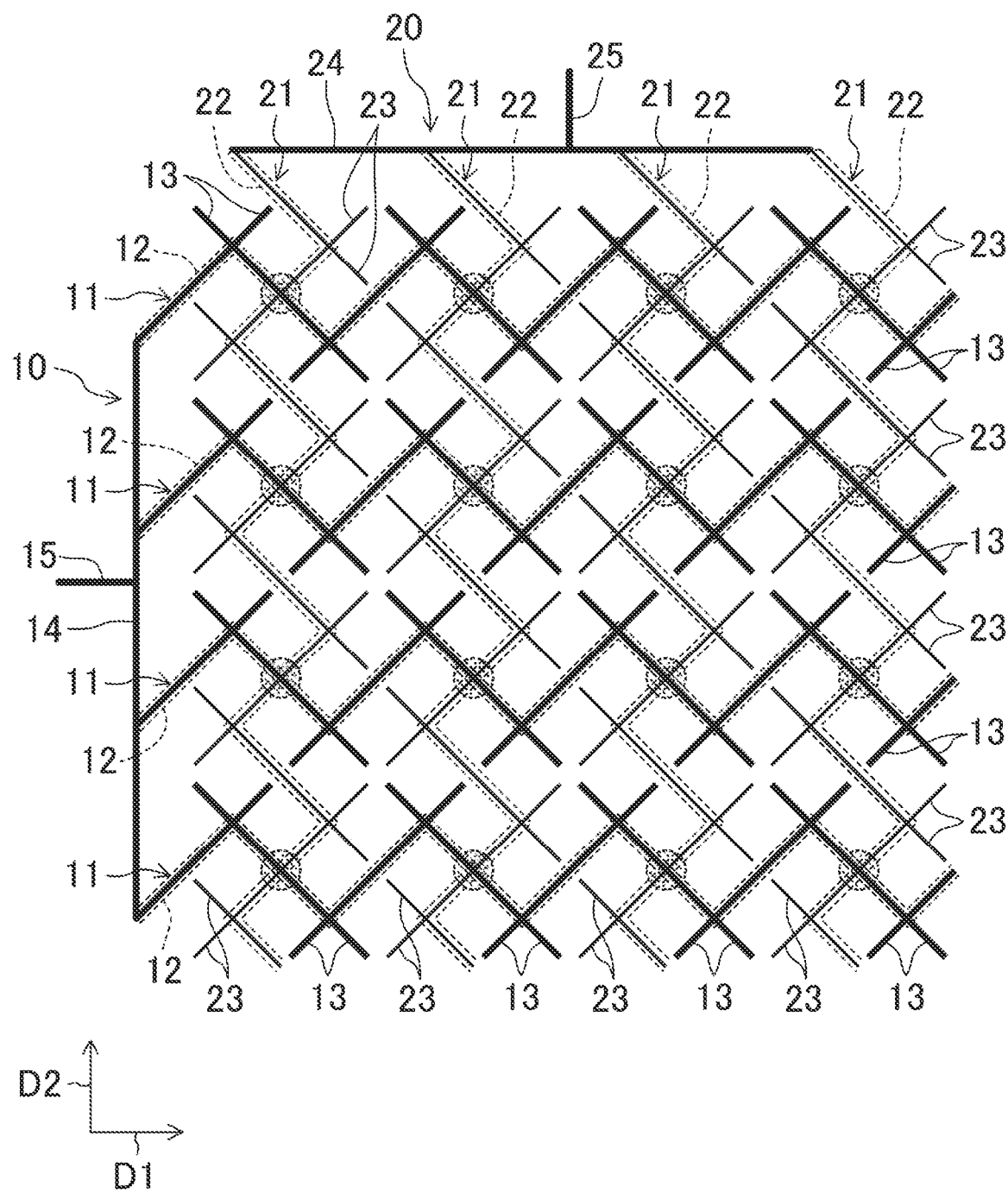
FIG. 6 is a partially enlarged view showing a part of overlap between one of the transmission electrodes on the top of the plane and one of the reception electrodes on the left of the plane of FIG. 1.

As shown in FIG. 6, each of the first electrode sections 11 includes one of the first main lines 12. The first main lines 12 extend in a zigzag manner in the first direction D1.

Figure 7:
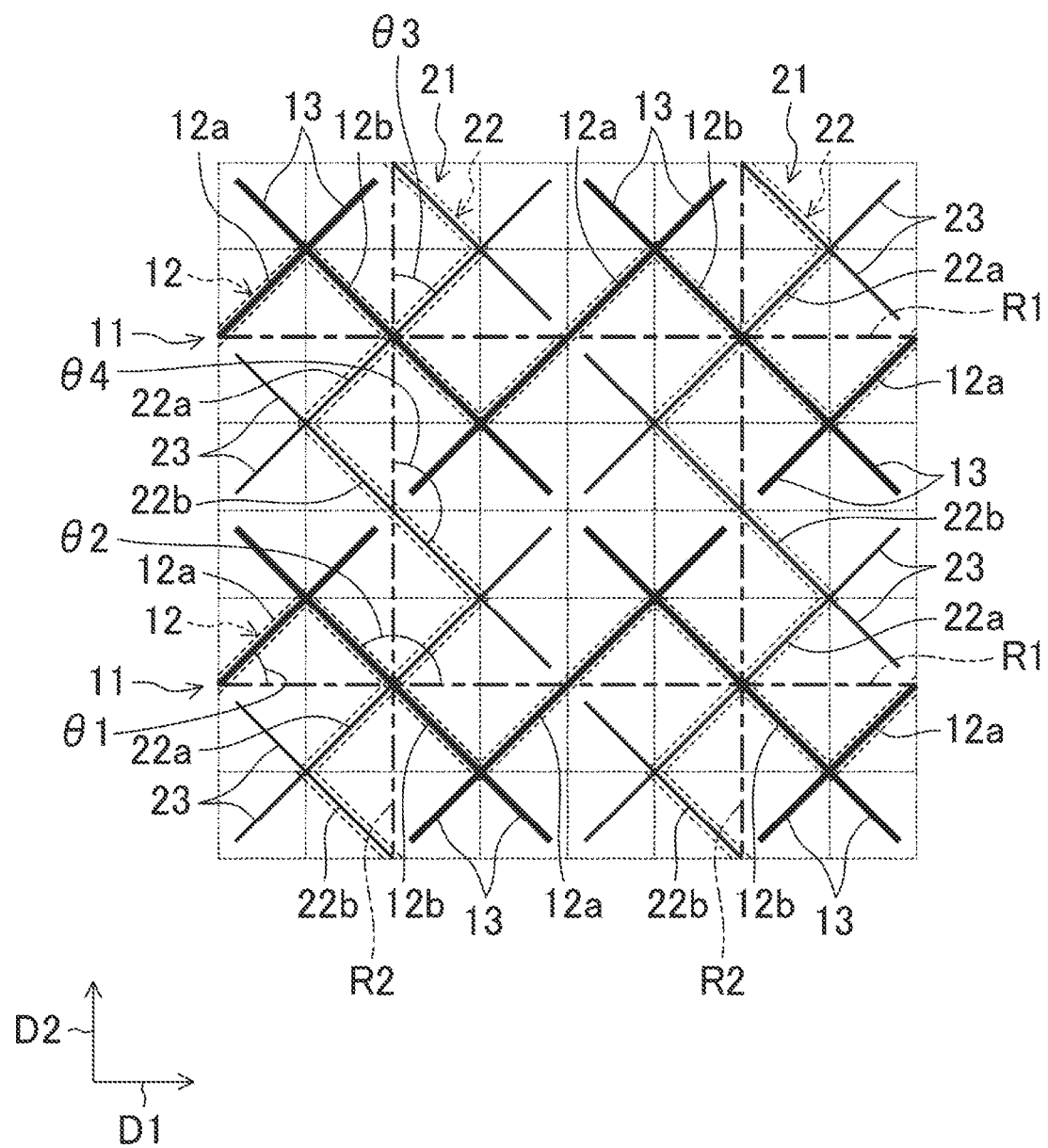
FIG. 7 is an enlarged schematic view showing a state of overlap between the first and second electrode sections.

Specifically, as shown in FIG. 7, each first main line 12 includes a plurality of inclined lines 12a and a plurality of inclined lines 12b. In FIGS. 6 and 7, each of the first main lines 12 is surrounded by a broken line so as to be distinguishable from the first auxiliary lines 13 which will be described later.

FIG. 7 shows that the first electrode sections 11 and second electrode sections 21, which will be described later, overlap a plurality of cells forming an imaginary grid. This imaginary grid is an element given for the sake of simplicity in designing the configurations of the first and second electrode sections 11 and 21. In this embodiment, the cells are each formed into a square shape. The cells are aligned in the first and second directions D1 and D2. The cells are in the same size.

The grid in FIG. 7 includes a plurality of first reference lines R1 that are imaginary. The first reference lines R1 extend linearly in the first direction D1. In this embodiment, adjacent ones of the first reference lines R1 and R1 are spaced apart from each other by four cells in the second direction D2 in the grid.

Each of the inclined lines 12a and 12b extends in a direction intersecting the first reference lines RE Specifically, in this embodiment, each inclined line 12a and a corresponding one of the first reference lines R1 form an angle θ1 of 45°, whereas each inclined line 12b and a corresponding one of the first reference lines R1 form an angle θ2 of 135°. The inclined lines 12a and 12b each extend diagonally in two diagonally continuous ones of the cells. In addition, the inclined lines 12a and 12b each intersect a corresponding one of the first reference lines R1 at the midpoint.

The inclined lines 12a and 12b are arranged alternately along the first reference lines R1 Specifically, each of the paired inclined lines 12a and 12b has upper ends continuous with each other and lower ends continuous with each other on the plane of FIG. 7. That is, each first main line 12 has a single continuous current path.

(First Auxiliary Line)

As shown in FIG. 6, each first electrode section 11 includes the plurality of first auxiliary lines 13. The first auxiliary lines 13 branch off from each of the first main lines 12. As shown in FIG. 7, two first auxiliary lines 13 branch off from each corner (i.e., the connecting point between each of the paired inclined lines 12a and 12b) of the first main lines 12. Specifically, one of the first auxiliary lines 13 extends in the direction in which the inclined line 12a extends. The other first auxiliary line 13 extends in the direction in which the inclined line 12b extends. The first auxiliary lines 13 have a shorter length than the diagonals of each cell.

(Second Electrode Section)

Figure 5:
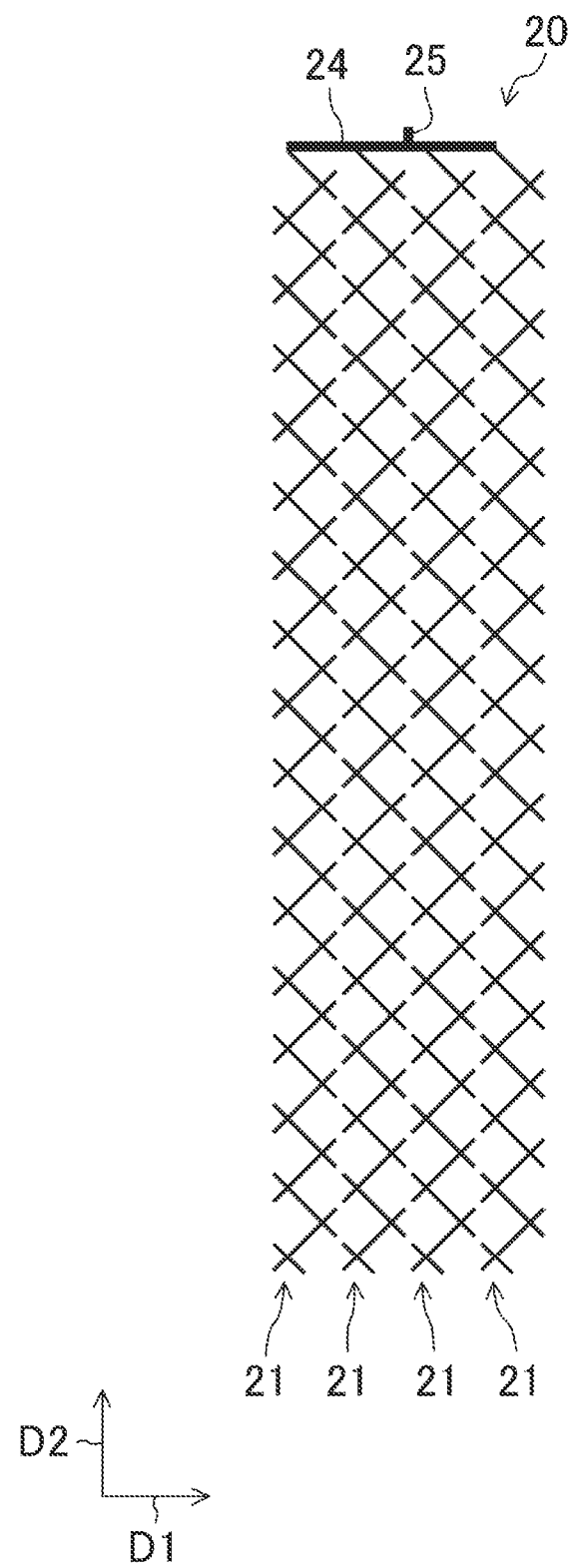
FIG. 5 is an enlarged view schematically showing some of the second electrode sections taken out of FIG. 3.

As shown in FIG. 5, each of the reception electrodes 20 includes a plurality of second electrode sections 21. The second electrode sections 21 are electrically connected to each other via a second-electrode terminal 24 which will be described later. Each of the second electrode sections 21 includes a plurality of thin wires. The thin wires forming each second electrode section 21 are made of, for example, an electrical conducting material embedded in the groove (not shown) of the upper surface of the upper substrate 2b.

(Second Main Line)

As shown in FIG. 6, each of the second electrode sections 21 includes one of the second main lines 22. The second main lines 22 extend in a zigzag manner in the second direction D2. Specifically, each second main line 22 includes a plurality of inclined lines 22a and a plurality of inclined lines 22*b*. In FIGS. 6 and 7, each of the second main line 22 is surrounded by a broken line so as to be distinguishable from the second auxiliary lines 23 which will be described later.

The grid in FIG. 7 includes a plurality of second reference lines R2 that are imaginary. The second reference lines R2 extend linearly in the second direction D2. In this embodiment, adjacent ones of the second reference lines R2 and R2 are spaced apart from each other by four cells in the first direction D1 in the grid.

Each of the inclined lines 22*a* and 22*b* extends in a direction intersecting the second reference lines R2. Specifically, in this embodiment, each inclined line 22*a* and a corresponding one of the second reference lines R2 form an angle θ3 of 45°, whereas each inclined line 22*b* and the corresponding one of the second reference lines R2 form an angle θ4 of 135°. the inclined lines 22*a* and 22*b* each extend diagonally in two diagonally continuous ones of the cells. In addition, the inclined lines 22*a* and 22*b* each intersect a corresponding one of the second reference lines R2 at the midpoint.

The inclined lines 22*a* and 22*b* are arranged alternately along the second reference lines R2. Specifically, each of the paired inclined lines 22*a* and 22*b* has left ends continuous with each other and right ends continuous with each other on the plane of FIG. 7. That is, each second main line 22 has a single continuous current path.

(Second Auxiliary Line)

As shown in FIG. 6, each second electrode section 21 includes the plurality of second auxiliary lines 23. The second auxiliary lines 23 branch off from each of the second main lines 22. As shown in FIG. 7, two second auxiliary lines 23 branch off from each corner (i.e., the connecting point between each pair of the inclined lines 22*a* and 22*b*) of the second main lines 22. Specifically, one of the second auxiliary lines 23 extends in the direction in which the inclined line 22*a* extends. The other second auxiliary line 23 extends in the direction in which the inclined line 22*b* extends. The second auxiliary lines 23 each have a shorter length than the diagonals of each cell.

(Intersection between First and Second Main Lines)

As shown in FIGS. 6 and 7, with the transmission and reception electrodes 10 and 20 overlapping each other, each of the paired first and second main lines 12 and 22 intersect with each other at one point. In this embodiment, the intersections between the first and second main lines 12 and 22 (see broken circles in FIG. 6) overlap the intersections between the first and second reference lines R1 and R2.

(Cell Region)

As shown in FIGS. 6 and 7, with the transmission and reception electrodes 10 and overlapping each other, there are a plurality of cell regions. Each cell region is surrounded by two or more types of thin wires selected from a group consisting of the first main lines 12, the first auxiliary lines 13, the second main lines 22, and the second auxiliary lines 23. Each cell region is unclosed.

In this embodiment, the cell regions include those of first and second patterns. Each cell region of the first pattern is surrounded by one of the first main lines 12, one of the first auxiliary lines 13, and one of the second main lines 22. Each cell region of the second pattern is surrounded by one of the first main lines 12, one of the second main lines 22, and one of the second auxiliary lines 23. That is, each of the cell regions includes at least one of the first and second auxiliary lines 13 and 23.

The distal end of at least one of the first and second auxiliary lines 13 and 23 is disconnected, with a predetermined gap, from the distal end or an intermediate point of any one type of the thin wires selected from the group described above. Specifically, in each cell region of the first pattern described above, the distal end of the associated first auxiliary line 13 is spaced apart from the midpoint of the associated second main line 22. In each cell region of the second pattern described above, the distal end of the associated second auxiliary line 23 is spaced apart from the midpoint of the associated first main line 12. That is, each cell region is unclosed with part of the thin wires missing. Here, the gap is set within a range from 5 μm to 80 μm in one preferred embodiment.

In the first embodiment, with the transmission and reception electrodes 10 and 20 overlapping each other, the plurality of cell regions fill the entire active area A1. The first embodiment thus requires no dummy electrode (not shown).

(First-Electrode Terminal)

As shown in FIGS. 2 and 4, each transmission electrode 10 has an end with the first-electrode terminal 14 to be connected to one of the first leads 15 which will be described later. Specifically, the first-electrode terminal 14 is electrically connected to one ends (i.e., the left ends on the plane of FIG. 2) of the first main lines 12. The first-electrode terminal 14 is formed of one thin wire, for example. The thin wire forming the first-electrode terminal 14 has a width of, for example, 8.0 μm in one preferred embodiment.

(Second-Electrode Terminal)

As shown in FIGS. 3 and 5, each reception electrode 20 has an end with the second-electrode terminal 24 to be connected to one of the second leads 25 which will be described later. Specifically, the second-electrode terminal 24 is electrically connected to one ends (i.e., the upper ends on the plane of FIG. 3) of the second main lines 22. The second-electrode terminal 24 is formed of one thin wire, for example. The thin wire forming the second-electrode terminal 24 has a width of, for example, 8.0 μm in one preferred embodiment.

(First and Second Leads)

As shown in FIGS. 1 to 3, the touch sensor 1 includes the first and second leads 15 and 25. The first leads 15 are elements for electrically connecting the transmission electrodes to the drive circuit of the control circuit described above. The second leads 25 are elements for electrically connecting the reception electrodes 20 to the detection circuit of the control circuit described above.

The first and second leads 15 and 25 are arranged in the inactive area A2. Overlapping a substantially frame-shaped decoration (not shown) along the lower edge of the cover member (not shown), the first and second leads 15 and 25 are invisible to the user from the viewing side of the touch sensor 1.

As shown in FIG. 2, the first leads 15 are located on the upper surface of the lower substrate 2*a*. One ends of the first leads 15 are electrically connected to the respective electrode terminals 14. The other ends of the first leads 15 are collected substantially at the center in the first direction D1 at the top on the plane of FIG. 2.

As shown in FIG. 3, the second leads 25 are located on the upper surface of the upper substrate 2*b*. One ends of the second leads 25 are electrically connected to the respective electrode terminals 24. The other ends of the second leads 25 are collected substantially at the center in the first direction D1 at the top on the plane of FIG. 3.

Each of the first and second leads 15 and 25 is formed of one thin wire, for example. The thin wires forming the first and second leads 15 and 25 have larger widths than the thin wires forming the transmission and reception electrodes 10 and 20 in one preferred embodiment. The thin wires forming the first and second leads 15 and 25 have a width of 8.0 µm, for example.

Advantages of First Embodiment

As described above, each first electrode section 11 includes: the first main line 12 extending in a zigzag manner in the first direction D1; and the plurality of first auxiliary lines 13 branching off from the first main line 12 in a direction intersecting the first and second directions D1 and D2. Each second electrode section 21 includes: the second main line 22 extending in a zigzag manner in the second direction D2; and the plurality of second auxiliary lines 23 branching off from the second main line 22 in a direction intersecting the first and second directions D1 and D2. That is, none of the first main lines 12, the first auxiliary lines 13, the second main lines 22, and the second auxiliary lines 23 overlaps the black matrix of the liquid crystal display (not shown). This configuration reduces the interference with the black matrix and the increase in the amplitude of the spatial frequency due to the interference. This results in reduction in the occurrence of moiré and excellent visibility of the touch sensor 1.

With the first and second auxiliary lines 13 and 23 provided, the proportion of the thin wires to the active area A1 increases. This causes less display unevenness when the user views the display from the viewing side of the touch sensor 1. In addition, the thin wires each forming the first and second electrode sections 11 and 21 are less visible from the viewing side of the touch sensor 1. In this manner, reduction in the display unevenness and suppression of the appearance of wires lead to excellent visibility of the touch sensor 1.

With the transmission and reception electrodes 10 and 20 overlapping each other, each of the paired first and second main lines 12 and 22 intersect with each other at one point. This configuration requires only a small number of intersections between the first and second main lines 12 and 22. This results in suppression of increase in the coupling capacitance of the active area A1 as a whole.

With the transmission and reception electrodes 10 and 20 overlapping each other, each cell region is unclosed. This configuration suppresses increase in the coupling capacitance between the thin wires forming each cell region, while keeping a single intersection between each of the paired first and second main lines 12 and 22 and without increasing the number of intersections between the thin wires. In addition, with a large number of unclosed cell regions, the active area A1 easily has sensor characteristics approximate to those of a planar sensor matrix. This results in a higher accuracy in detecting a touch point, when a user operates the touch sensor 1. In addition, the sensitivity at the touch point easily improves.

The touch sensor 1 of the first embodiment reduces the variations in the sensitivity depending on a touch point, while providing excellent visibility and suppressing increase in the coupling capacitance, resulting in a higher location accuracy.

Each of the cell regions described in the first embodiment includes at least one of the first and second auxiliary lines 13 and 23. The distal end of at least one of the first and second auxiliary lines 13 and 23 is disconnected, with a gap, from the distal end or an intermediate point of any one type of the thin wires selected from the group described above. With this gap, it is easily possible to form an unclosed cell region. The unclosed cell region with the gap suppresses increase in the coupling capacitance between the thin wires forming the cell region, while keeping a single intersection between the paired first and second main lines 12 and 22 and without increasing the number of intersections between the thin wires.

In addition, with the gap set within a range from 5 µm to 80 µm, the first auxiliary lines 13 and/or the second auxiliary lines 23 can be relatively long. This results in reduction in the display unevenness and suppression of the appearance of wires, which leads to excellent visibility.

Variations of First Embodiment

First to eighth variations of the first embodiment will be described below. In the following first to eighth variations, differences from the first embodiment will be mainly described.

(First Variation)

Figure 8:
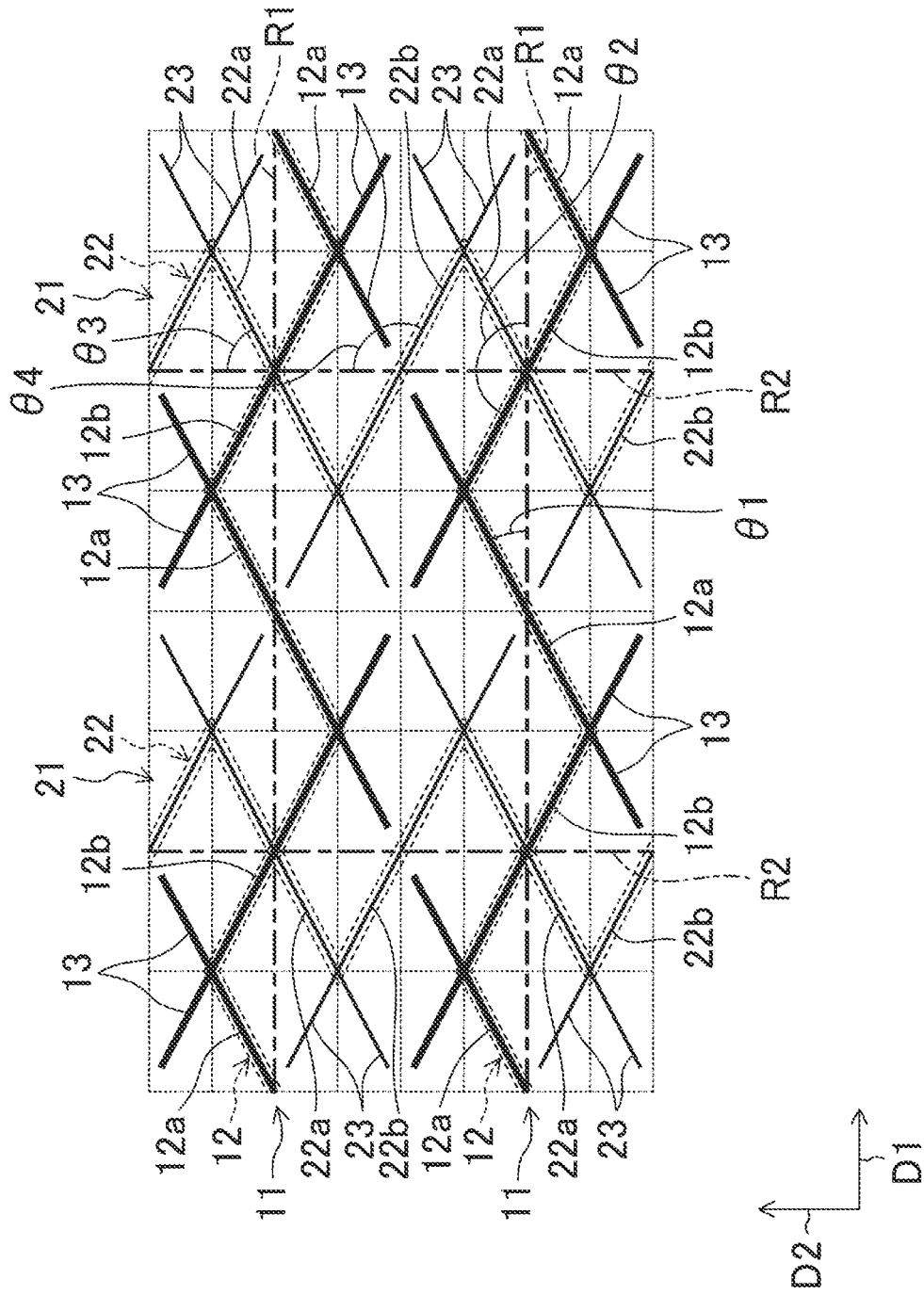
FIG. 8 is an enlarged view corresponding to FIG. 7 and showing a state of overlap between first and second electrode sections of a first variation.

While the configurations of the first and second electrode sections 11 and 21 have been described using the imaginary grid of the cells in a square shape in the first embodiment, the cells are not necessarily in a square shape. For example, as in a first variation shown in FIG. 8, the cells may be in a rectangular shape with long sides extending in the first direction D1 and short sides extending in the second direction D2.

With the use of an imaginary grid of rectangular cells, each inclined line 12a and a corresponding one of the first reference lines R1 form an angle θ1 smaller than 30°, whereas each inclined line 12b and the corresponding one of the first reference lines R1 form an angle θ2 larger than 150°. On the other hand, each inclined line 22a and a corresponding one of the second reference lines R2 form an angle θ3 larger than 60°, whereas each inclined line 22b and a corresponding one of the second reference lines R2 form an angle θ4 smaller than 120°.

In this manner, the angle between each inclined line 12a and the corresponding first reference line R1 and the angle between each inclined line 12b and the corresponding first reference line R1 are changed as appropriate. Accordingly, it is possible to make adjustment for preventing overlap with the black matrix of the liquid crystal display (not shown). Note that the other configurations are the same as those in the first embodiment, and detailed description thereof will thus be omitted.

(Second Variation)

Figure 9:
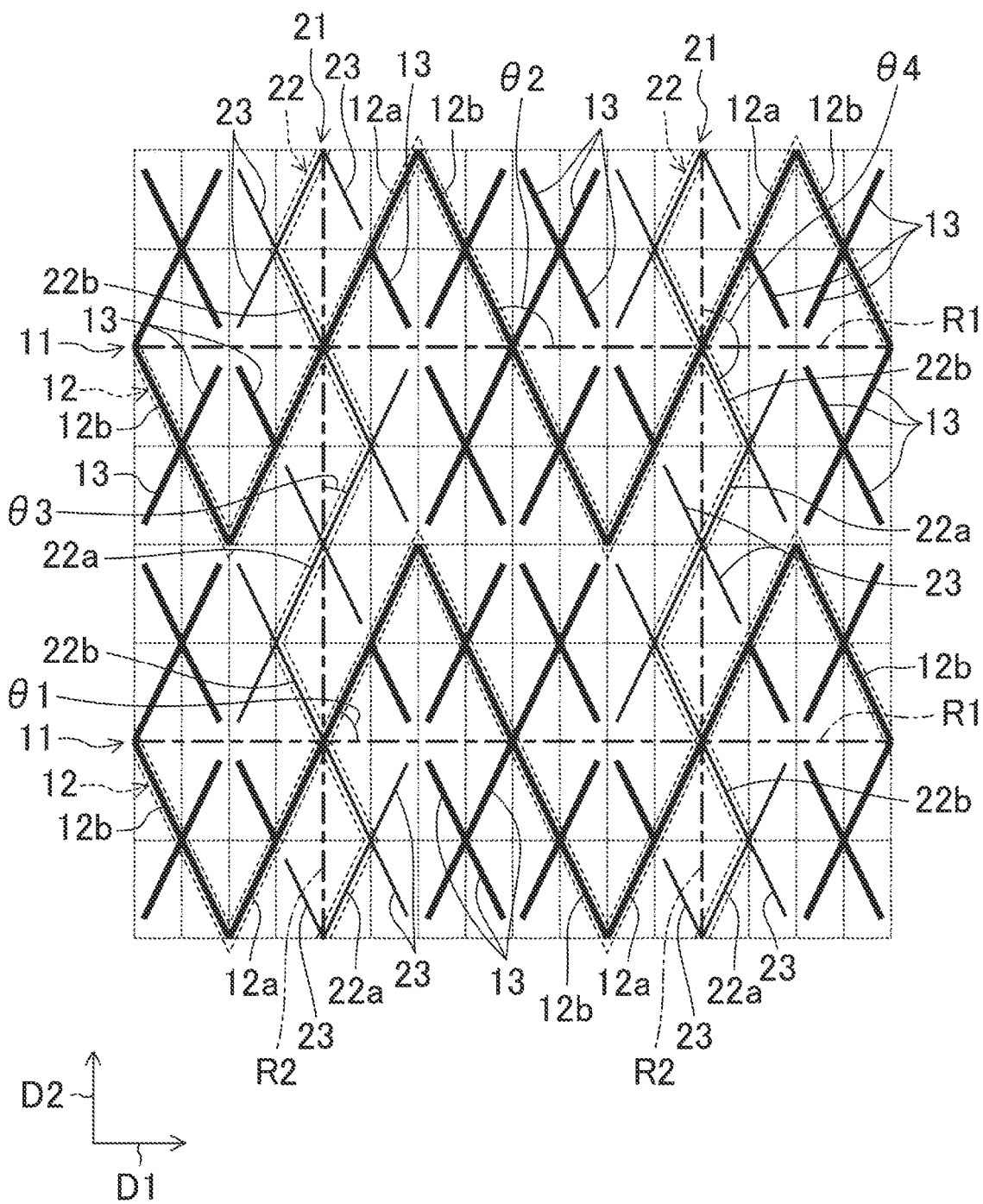
FIG. 9 is an enlarged view corresponding to FIG. 7 and showing a state of overlap between first and second electrode sections of a second variation.

As shown in FIG. 9, the cells used in a second variation are formed into a rectangular shape with long sides extending in the second direction D2 and short sides extending in the first direction D1. With the use of an imaginary grid of such cells, each inclined line 12a and a corresponding one of the first reference lines R1 form an angle θ1 larger than 60°, whereas each inclined line 12b and a corresponding one of the first reference lines R1 form an angle θ2 smaller than 120°. On the other hand, each inclined line 22a and a corresponding one of the second reference lines R2 form an angle θ3 larger than 30°, whereas each inclined line 22b and a corresponding one of the second reference lines R2 form an angle θ4 smaller than 150°.

In the second variation, unlike in the first embodiment, adjacent ones of the second reference lines R2 and R2 are spaced apart from each other by eight cells in the first direction D1 in the grid. Each of the inclined lines 12a and 12b extends diagonally in four diagonally continuous ones of the cells.

While only an example has been described above in the first embodiment where two first auxiliary lines 13 branch off from each corner (i.e., the connecting point between each of the paired inclined lines 12a and 12b) of the first main lines 12, the configuration is not limited thereto. For example, as in the second variation, at least one of the first auxiliary lines 13 may branch off from an intermediate point of each of the inclined lines 12a and 12b.

Specifically, in each first main line 12, two first auxiliary lines 13 branch off from intermediate points of each inclined line 12a, whereas six first auxiliary lines 13 branch off from intermediate points of each inclined line 12b. Specifically, two first auxiliary lines 13 branch off from those of the first auxiliary lines 13 which are continuous with one another at one of the intermediate points of each inclined line 12b. In each second main line 22, two second auxiliary lines 23 branch off from each corner of the second main line 22, whereas two second auxiliary lines 23 branch off from an intermediate point of each inclined line 22a.

As described above, as compared to the first embodiment, the second variation employs a large number of the first and second auxiliary lines 13 and 23, which are arranged in the active area A1, relative to the number of the first and second main lines 12 and 22.

In the second variation, the cell regions include those of the first and second patterns described above in the first embodiment and third and fourth patterns. Each cell region of the third pattern is surrounded by one of the first auxiliary lines 13 and one of the second auxiliary lines 23. Each cell region of the fourth pattern is surrounded by one of the first main lines 12 and one of the second auxiliary lines 13. That is, the second variation employs more patterns forming the cell regions than the first embodiment. In particular, the cell regions including the third pattern can be miniaturized, while requiring only a small number of intersections between each of the paired first and second main lines 12 and 22 and without increasing the number of the first and second main lines 12 and 22. Accordingly, the cell regions can be arranged at a higher density.

In addition, the cell regions of the second variation include the fourth pattern. This relatively increases the proportion of the first electrode sections 11 (i.e., the first main lines 12 and the first auxiliary lines 13) to the active area A1. That is, the second variation has a higher proportion of the transmission electrodes 10 to the active area A1 than that of the reception electrodes 20 to the active area A1. Accordingly, for example, the width of the transmission electrodes 10 in the second direction D2 is greater than the width of the reception electrodes 20 in the first direction D1. Such a configuration allows for relative increase in the number of lines of force emitted from the transmission electrodes 10 in the active area A1. Accordingly, this allows for a higher sensor sensitivity of the touch sensor 1. In the present disclosure, the surface areas of each of the transmission and reception electrodes 10 and 20 corresponds to the area of a collective region of a plurality of thin wires. That is, the size of the surface area in each of the transmission and reception electrodes 10 and 20 depends on the size of the area of the collective region of the thin wires.

In the second variation, the cell regions of the fourth pattern, which are surrounded by one of the first main lines 12 and one of the first auxiliary lines 13, are also unclosed. Alternatively, not all the cell regions of the fourth pattern may be unclosed. This is because the number of intersections between the first and second main lines 12 and 22 does not increase in the active area A1, even if the cell regions of the fourth pattern are closed.

(Third Variation)

Figure 10:
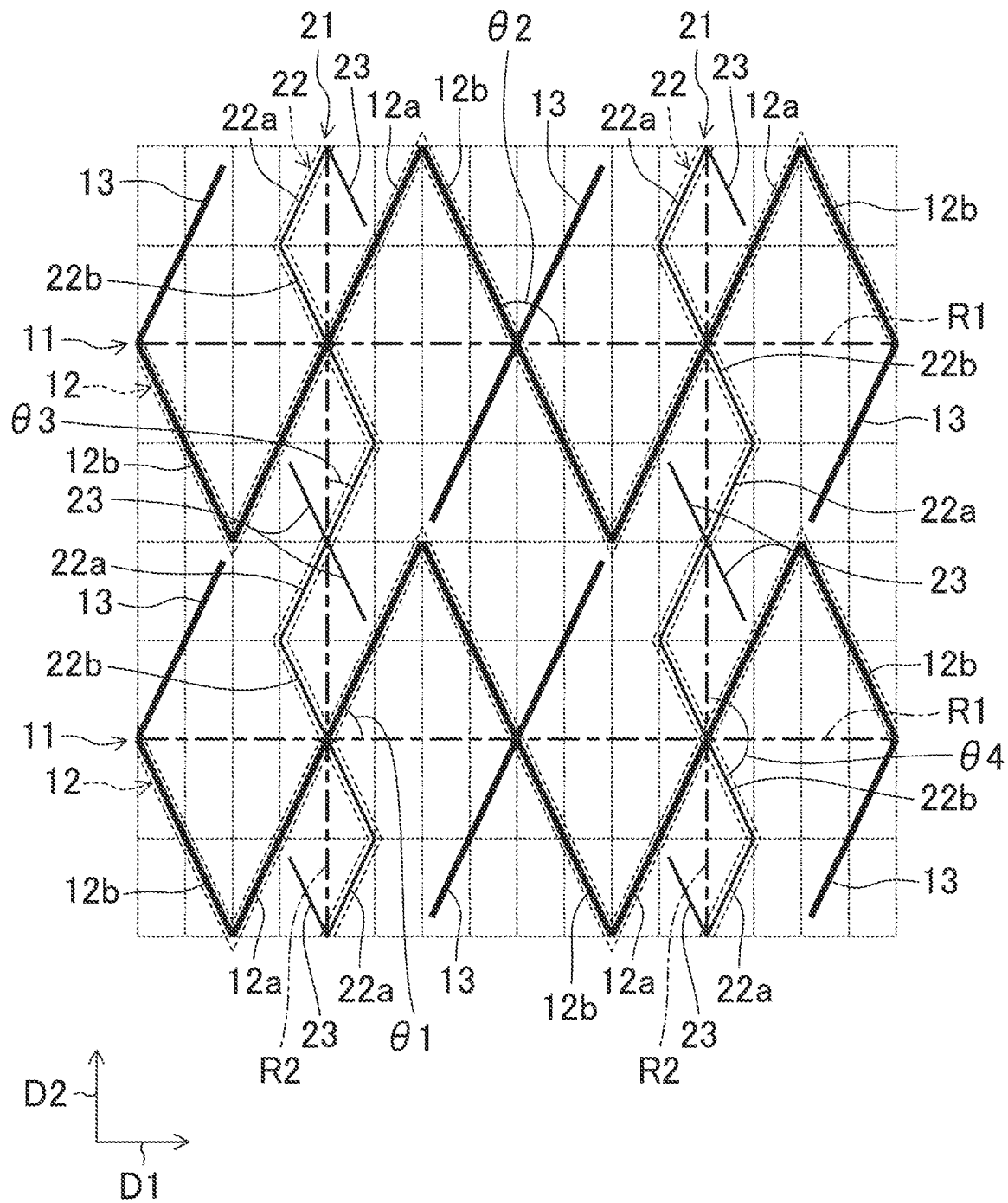
FIG. 10 is an enlarged view corresponding to FIG. 7 and showing a state of overlap between first and second electrode sections of a third variation.

A third variation shown in FIG. 10 is a further variation of the second variation. If neither miniaturization nor a higher density of the cell regions is required as in the second variation, the number of the first and second auxiliary lines 13 and 23 may be reduced as appropriate as in the third variation. Note that the cell regions according to the third variation does not include the fourth pattern described above.

(Fourth Variation)

Figure 11:
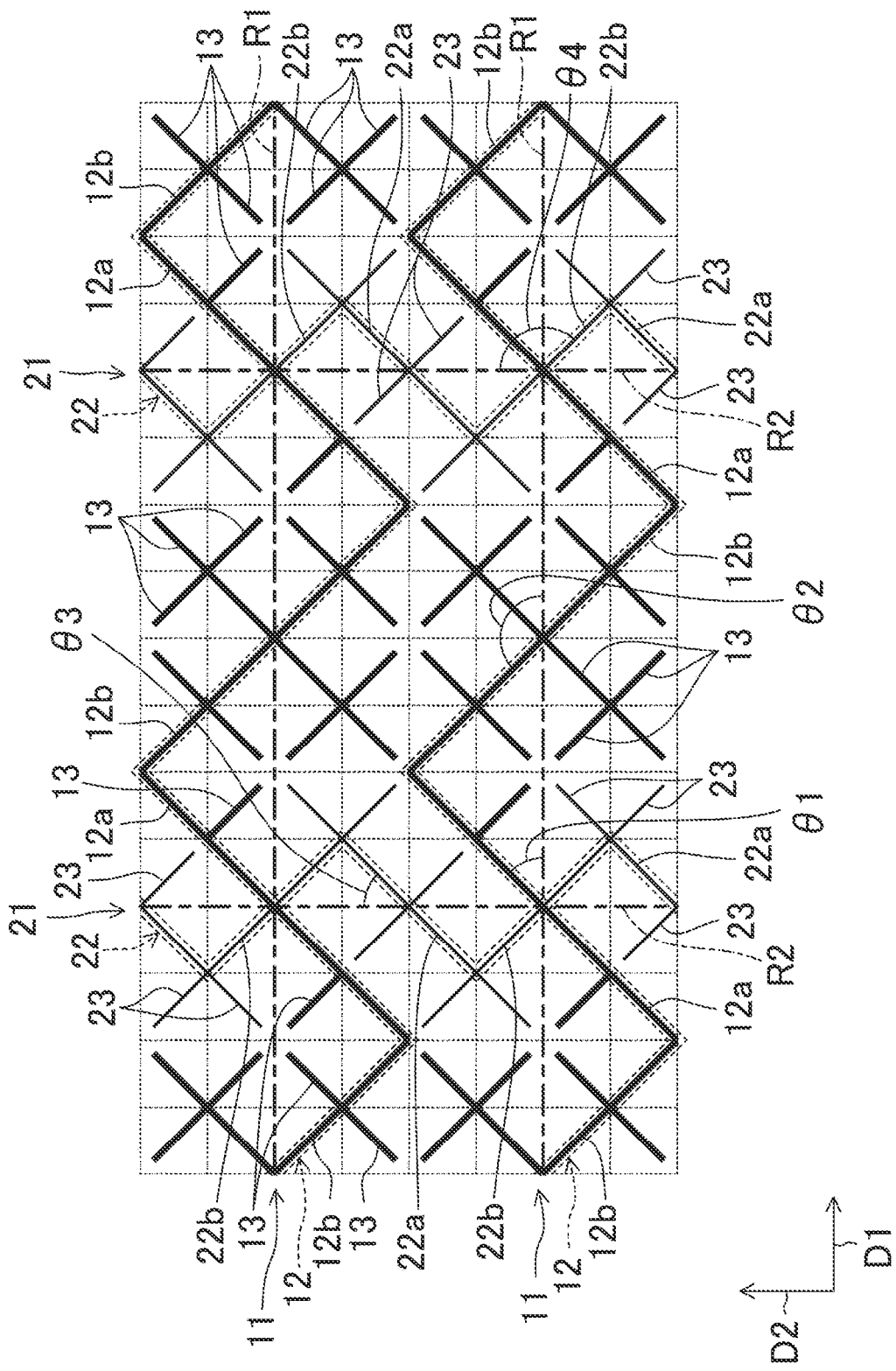
FIG. 11 is an enlarged view corresponding to FIG. 7 and showing a state of overlap between first and second electrode sections of a fourth variation.

A fourth variation shown in FIG. 11 is a further variation of the second variation. The fourth variation differs from the second variation in the shape of the cells. Specifically, the cells according to the fourth variation are formed into a square shape as in the first embodiment. That is, each inclined line 12a and a corresponding one of the first reference lines R1 form an angle $\theta1$ of 45°, whereas each inclined line 12b and a corresponding one of the first reference lines R1 form an angle $\theta2$ of 135°. On the other hand, each inclined line 22a and a corresponding one of the second reference lines R2 form an angle $\theta3$ of 45°, whereas each inclined line 22b and a corresponding one of the second reference lines R2 form an angle $\theta4$ of 135°.

(Fifth Variation)

Figure 12:
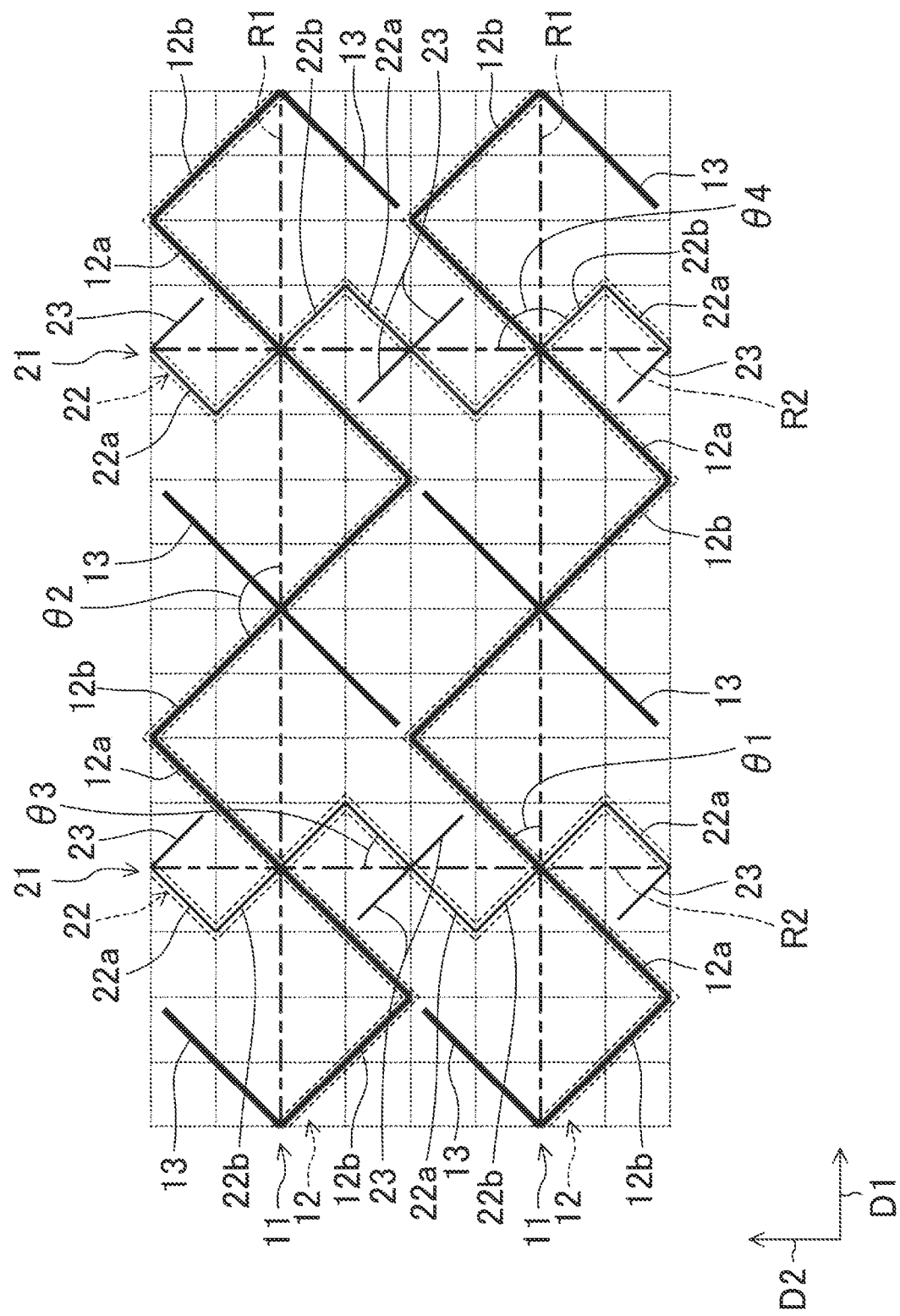
FIG. 12 is an enlarged view corresponding to FIG. 7 and showing a state of overlap between first and second electrode sections of a fifth variation.

A fifth variation shown in FIG. 12 is a further variation of the fourth variation. If neither miniaturization nor a higher density of the cell regions is required as in the fourth variation, the number of the first and second auxiliary lines 13 and 23 may be reduced as appropriate as in the fifth variation. Note that the cell regions according to the fifth variation do not include the fourth pattern described above.

(Sixth Variation)

Figure 13:
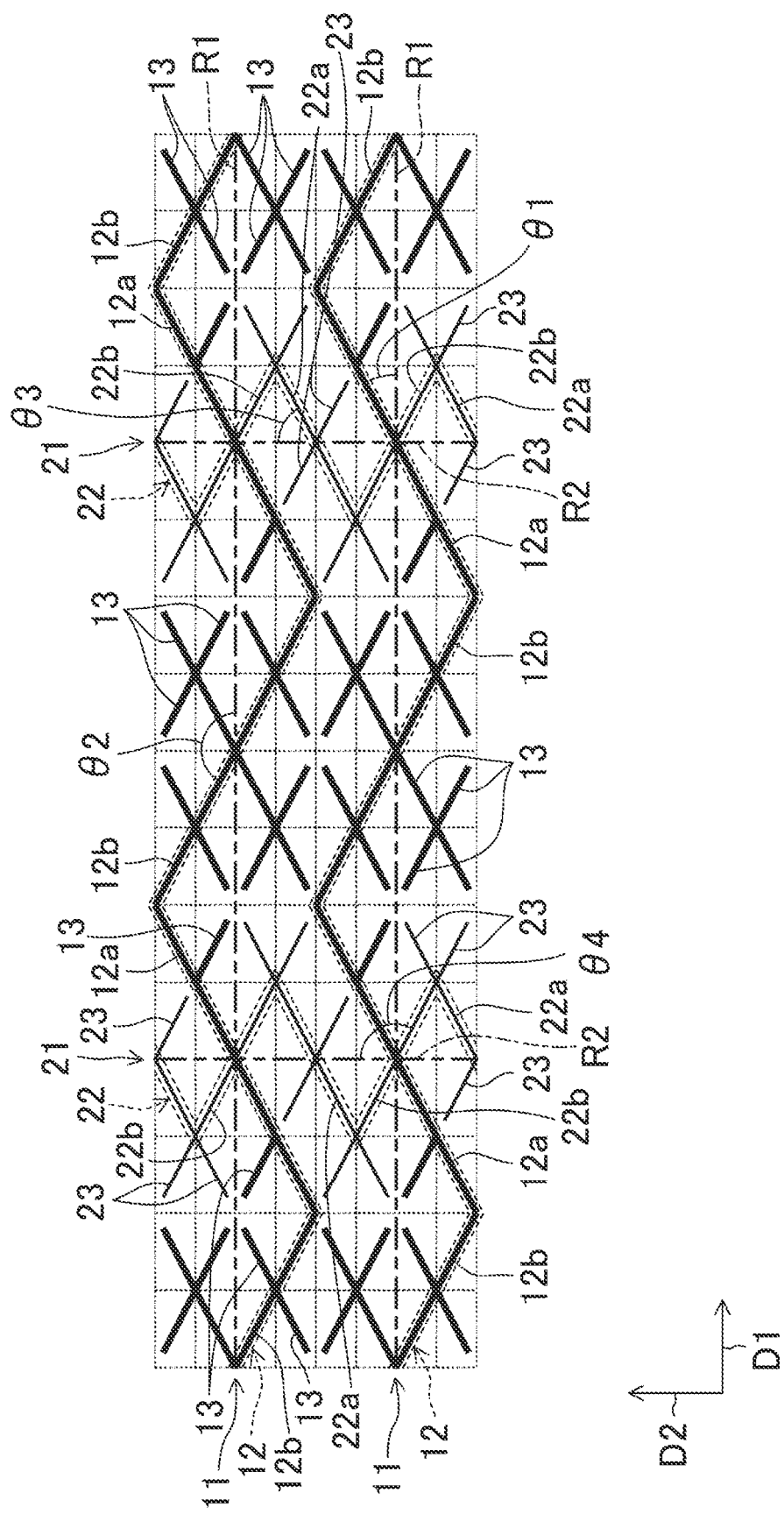
FIG. 13 is an enlarged view corresponding to FIG. 7 and showing a state of overlap between first and second electrode sections of a sixth variation.

A sixth variation shown in FIG. 13 is a further variation of the second variation. The sixth variation differs from the second variation in the shape of the cells. Specifically, the cells in the sixth variation are formed into a rectangular shape with long sides extending in the first direction D1 and short sides extending in the second direction D2. Accordingly, each inclined line 12a and a corresponding one of the first reference lines R1 form an angle $\theta1$ smaller than 30°, whereas each inclined line 12b and a corresponding one of the first reference lines R1 form an angle $\theta2$ larger than 150°. On the other hand, each inclined line 22a and a corresponding one of the second reference lines R2 form an angle $\theta3$ larger than whereas each inclined line 12b and a corresponding one of the first reference lines R1 form an angle $\theta4$ smaller than 120°.

Seventh Variation

Figure 14:
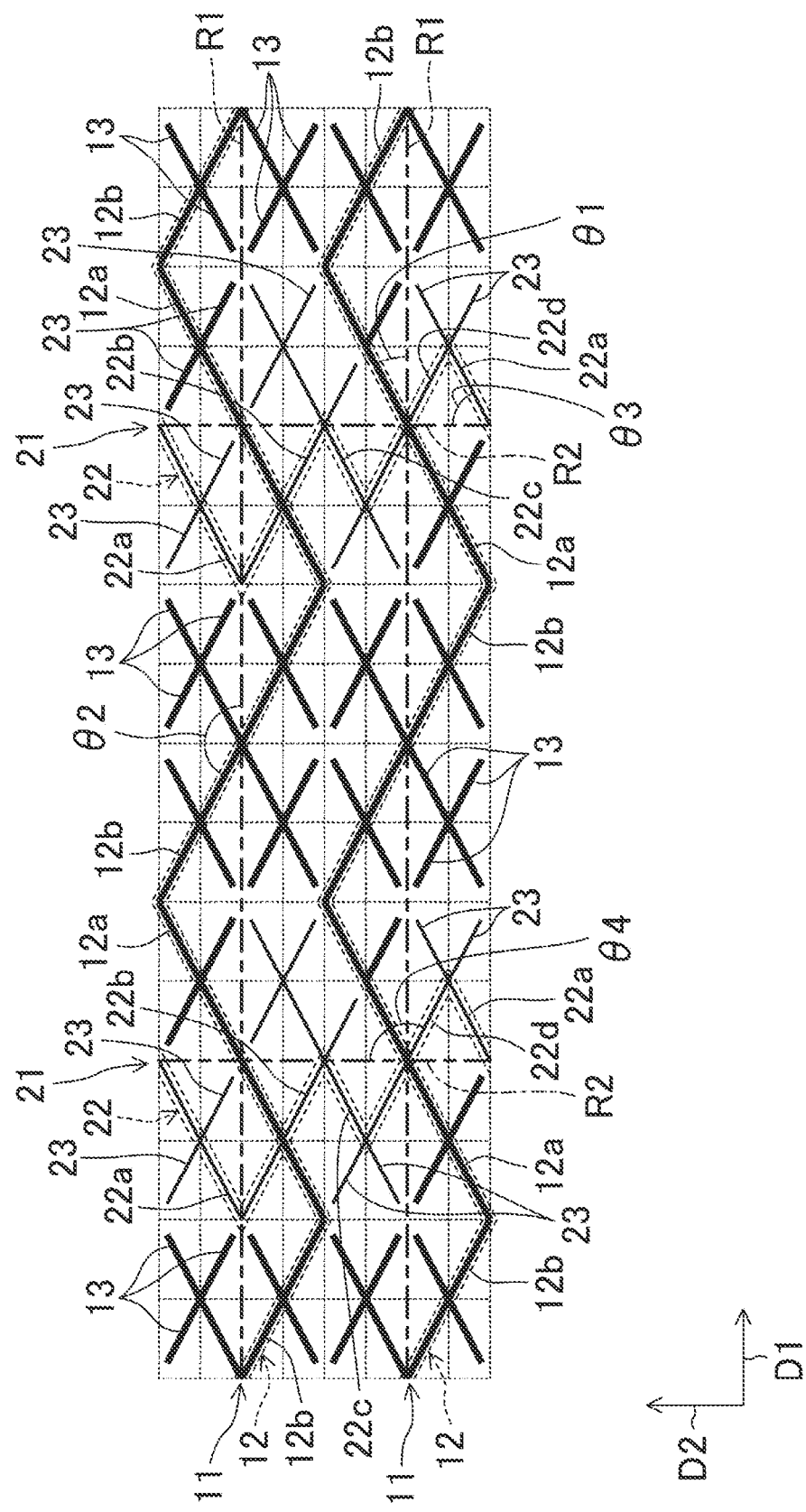
FIG. 14 is an enlarged view corresponding to FIG. 7 and showing a state of overlap between first and second electrode sections of a seventh variation.

A seventh variation shown in FIG. 14 is a further variation of the sixth variation. The seventh variation differs from the sixth variation mainly in the configuration of the second electrode sections 21. Specifically, each second main line 22 includes a plurality of inclined lines 22a, a plurality of inclined lines 22b, a plurality of inclined lines 22c, and a plurality of inclined lines 22d.

Each of the inclined lines 22a extends diagonally in three diagonally continuous wones of the cells. Each of the inclined lines 22a intersects one of the second reference lines R2.

Each inclined line 22b has an upper end (on the paper) that is continuous with the lower end (on the paper) of the corresponding inclined line 22a. Each of the inclined lines 22b extends diagonally in two diagonally continuous ones of the cells. Each of the inclined lines 22b intersects one of the second reference lines R2.

Each inclined line 22c has an upper end (on the paper) that is continuous with the lower end (on the paper) of the corresponding inclined line 22b. The inclined lines 22c extend parallel to the inclined lines 22a. Each of the inclined lines 22c extends diagonally in one of the cells. Each inclined line 22c has an upper end (on the paper) in contact with one of the second reference lines R2.

Each inclined line 22d has an upper end (on the paper) that is continuous with the lower end (on the paper) of the corresponding inclined line 22c. The inclined lines 22c extends parallel to the inclined lines 22a. Each of the inclined lines 22d extends diagonally in two diagonally continuous ones of the cells. Each of the inclined lines 22d intersects one of the first reference lines R1. Each inclined line 22c has an upper end (on the paper) in contact with one of the second reference lines R2. Each inclined line 22d has a lower end (on the paper) that is continuous with the upper end (on the paper) of another inclined line 22a.

In the seventh variation, a pattern with the intersection of each of the paired first and second main lines 12 and 22 on one of the first reference lines R1 and a pattern with the intersection of each of the paired first and second main lines 12 and 22 on one of the second reference lines R2 are arranged alternately in the second direction D2. That is, the intersections between the first and second main lines 12 and 22 do not necessarily overlap the intersections between the first and second reference lines R1 and R2 as in the seventh variation unlike in the first embodiment.

(Eighth Variation)

Figure 15:
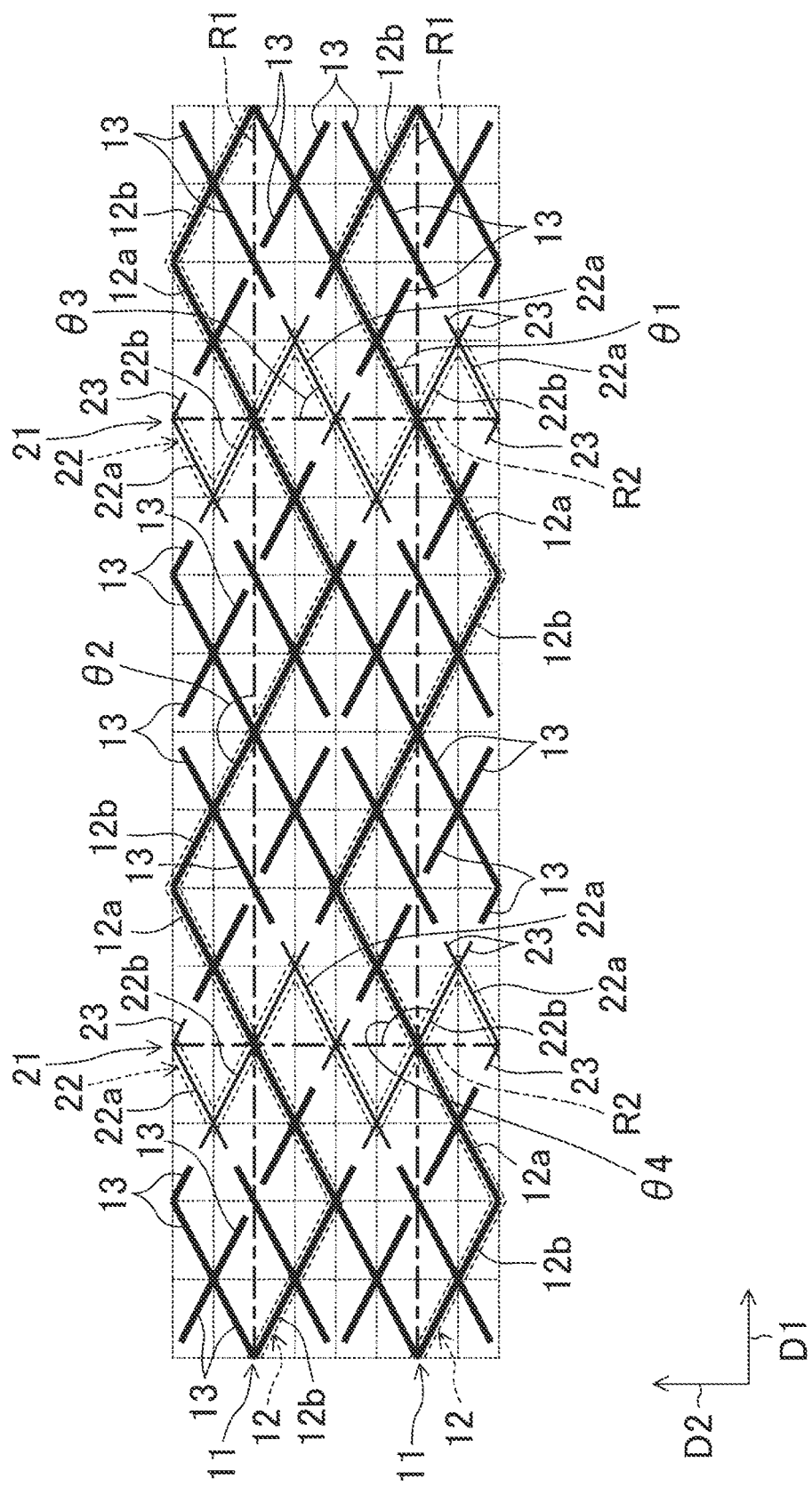
FIG. 15 is an enlarged view corresponding to FIG. 7 and showing a state of overlap between first and second electrode sections of an eighth variation.

An eighth variation shown in FIG. 15 is a further variation of the sixth variation. The eighth variation has a higher proportion of the first auxiliary lines 13 to the active area A1 than that of the second auxiliary lines 23 to the active area A1. Specifically, as in the eighth variation, a relatively larger number of the first auxiliary lines 13 may be used. Alternatively, the second auxiliary lines 23 may be shorter than the first auxiliary lines 13.

Second Embodiment

FIG. 16 shows a part of a touch sensor 1 of a second embodiment of the present disclosure. The second embodiment includes another configuration in addition to that in the first embodiment. Note that the touch sensor 1 of the second embodiment has the same main configuration as the touch sensor 1 according to the first variation of the first embodiment. For this reason, in the following description, the same parts as those shown in FIGS. 1 to 8 are denoted by the same reference characters, and detailed description thereof will be omitted.

As shown in FIG. 16, the inactive area A2 includes a plurality of first and second connectors 31 and 32. Each of the first and second connectors 31 and 32 is formed of a thin wire and substantially into a V-shape.

Each of the first connectors 31 is electrically connected to adjacent ones of the first electrode sections 11 and 11. The first connector 31 has an end that is continuous with the first main line 12 forming one of the first electrode sections 11. The first connector 31 has the other end that is continuous with one of the first auxiliary lines 13 forming the other first electrode section 11.

Each of the second connectors 32 is electrically connected to adjacent ones of the second electrode sections 21 and 21. The second connector 32 has an end that is continuous with the second main line 22 forming one of the second electrode sections 21. The second connector 32 has the other end that is continuous with one of the second auxiliary lines 23 forming the other second electrode section 21.

As described above, in the touch sensor 1 of the second embodiment, each adjacent pair of the first electrode sections 11 and 11 are conductive by one of the first connectors 31. Accordingly, for example, even if one of the first main lines 12 is disconnected, the other first main line 12, unless disconnected, compensates for the disconnection of the one first main line 12 through the corresponding one of the first connectors 31. The second connectors 32 also provide the same operation and advantages as the first connectors 31 described above.

While the first and second connectors 31 and 32 are arranged in the inactive area A2 in the second embodiment, the arrangement is not limited thereto. Specifically, at least one of the first or second connectors 31 and 32 may be arranged in the active area A1.

Variation of Second Embodiment

While the first and second connectors 31 and 32 are provided in the second embodiment, the arrangement is not limited thereto. For example, as shown in FIG. 17, only the second connectors 32 may be provided. The shape of the second connectors 32 is not limited to the substantially V-shape described above in the second embodiment. For example, as in this variation, the second connectors 32 may have ridges and valleys like a zigzag line. Note that the touch sensor 1 of this variation has the same main configuration as the touch sensor 1 of the second variation of the first embodiment.

Other Embodiments

While the "first direction D1" extends from the left to the right on the plane of the drawings, whereas the "second direction D2" extends from the bottom to the top on the plane of the drawings in the embodiments described above, the directions are not limited thereto. Specifically, the "second direction D2" may extend from the left to the right on the plane of the drawings, whereas the "first direction D1" may extend from the bottom to the top on the plane of the drawings.

While the lower and upper substrates 2a and 2b are used in the embodiments described above, the configuration is not limited thereto. For example, a single substrate (not shown) may be used in place of the lower and upper substrates 2a and 2b. Specifically, the transmission electrodes 10, the first-electrode terminals 14, and the first leads 15 may be located on one surface of the substrate, whereas the reception electrodes 20, the second-electrode terminals 24, and the second leads 25 may be located on the other surface of the substrate.

An example has been described above in the embodiments where the thin wires are made of an electrical conducting material embedded in a groove (not shown) of each substrate, the formation is not limited thereto. For example, the thin wires made of an electrical conducting material may be formed on the surface of each substrate without any groove.

While each of the first and second leads 15 and 25 is formed of one thin wire in the embodiments described above, the configuration is not limited thereto. Specifically, although not shown, each of the first and second leads 15 and 25 may be formed of two thin wires extending in parallel.

While the touch sensor 1 with the flexible wiring board 3 attached to the lower and upper substrates 2a and 2b has been described above in the embodiments, the configuration is not limited thereto. That is, the concept of the touch sensor 1 according to the present disclosure includes a state before attaching the flexible wiring board 3 and other elements to the lower and upper substrates 2a and 2b. The concept of the touch sensor 1 of the present disclosure also includes the following configuration. The transmission and reception electrodes 10 and 20 that can provide the operation and advantages described above are formed on an elongated base material (e.g., an elongated hoop member (not shown)) before forming the substrates individually.

While the embodiments of the present disclosure have been described above, the present disclosure is not limited thereto and various modifications can be made within the scope of the present disclosure.

INDUSTRIAL APPLICABILITY

The present disclosure is industrially applicable as a touch sensor that allows a touch operation.

DESCRIPTION OF REFERENCE CHARACTERS

1: Touch Sensor
10: Transmission Electrode
11: First Electrode Section
12: First Main Line
13: First Auxiliary Line
14: First-Electrode Terminal
15: First Lead
20: Reception Electrode
21: Second Electrode Section
22: Second Main Line
23: Second Auxiliary Line
24: Second-Electrode Terminal
25: Second Lead
31: First Connector
32: Second Connector
A1: Active Area
A2: Inactive Area
D1: First Direction
D2: Second Direction
R1: First Reference Line
R2: Second Reference Line

The invention claimed is:

1. A touch sensor of a capacitive type with an active area, the touch sensor comprising:
a plurality of transmission electrodes that are arranged in the active area along a first direction; and
a plurality of reception electrodes that are arranged in the active area along a second direction orthogonal to the first direction, wherein:
each of the plurality of transmission electrodes includes a plurality of first electrode sections that are each formed of a wire,
each of the plurality of first electrode sections includes:
a first main line arranged in a zigzag manner along the first direction; and
a plurality of first auxiliary lines branching off from all corners of the first main line in a direction intersecting the first direction and the second direction,
the first main line does not branch from any place of the first main line other than the corners,
each of the plurality of reception electrodes includes a plurality of second electrode sections that are each formed of a wire,
each of the plurality of second electrode sections includes:
a second main line arranged in a zigzag manner along the second direction; and
a plurality of second auxiliary lines branching off from all corners of the second main line in a direction intersecting the first direction and the second direction,
the second main line does not branch from any place of the second main line other than the corners,
the plurality of transmission electrodes and the plurality of reception electrodes overlap with each other in plan view,
the first main line of one of the plurality of first electrode sections and the second main line of one of the plurality of second electrode sections intersect each other at one point in plan view,
the plurality of first auxiliary lines of one of the plurality of first electrode sections are spaced apart from the plurality of first auxiliary lines of adjacent one of the plurality of first electrode sections,
the plurality of second auxiliary lines of one of the plurality of second electrode sections are spaced apart from the plurality of second auxiliary lines of adjacent one of the plurality of second electrode sections,
the active area comprises a plurality of cell regions in plan view, all the cell regions being unclosed, and
each of the cell regions is surrounded by two or more wires selected from a group consisting of the first main line, the plurality of first auxiliary lines, the second main line, and the plurality of second auxiliary lines, at least one of the two or more wires is selected from wires of the plurality of first electrode sections, and at least one of the two or more wires is selected from wires of the plurality of second electrode sections.

2. The touch sensor of claim 1, wherein:
each of the cell regions includes at least one of the first auxiliary lines and the second auxiliary lines, and
a distal end of at least one of the plurality of first auxiliary lines and the plurality of second auxiliary lines is disconnected, with a gap, from an distal end or an intermediate point of any one type of the wires selected from the group.

3. The touch sensor of claim 2, wherein the gap is set within a range from 5 μm to 80 μm.

4. The touch sensor of claim 1, wherein each of the cell regions includes a pattern surrounded by one of the plurality of first auxiliary lines and one of the plurality of second auxiliary lines.

5. The touch sensor of claim 1, wherein the plurality of transmission electrodes have a higher proportion to the active area than that of the plurality of reception electrodes to the active area.

6. The touch sensor of claim 1, wherein
adjacent ones of the plurality of first electrode sections are electrically connected to a first connector.

7. The touch sensor of claim 1, wherein
adjacent ones of the plurality of second electrode sections are electrically connected to a second connector.

8. A touch sensor of a capacitive type with an active area, the touch sensor comprising:
a plurality of transmission electrodes that are arranged in the active area along a first direction; and
a plurality of reception electrodes that are arranged in the active area along a second direction orthogonal to the first direction, wherein:
each of the plurality of transmission electrodes includes a plurality of first electrode sections that are each formed of a wire, in plan view, two adjacent ones of the plurality of first electrode sections form a first rectangular cell having a first corner, a second corner a first side that is connected to the first corner and has a first gap, a second side connected to the first corner, a third side connected to the first side and the second corner and has a second gap, and a fourth side connected to the second side and the second corner, in plan view, the two adjacent ones of the plurality of first electrode sections form a second rectangular cell having a first corner, a second corner, a first side that is connected to the first corner of the second rectangular cell and has a first gap, a second side connected to the first corner of the second rectangular cell, a third side connected to the first side and the second corner of the second rectangular cell and has a second gap, and a fourth side connected to the second side and the second corner of the second rectangular cell, the second corner of the second rectangular cell overlapping the first corner of the first rectangular cell, in plan view, two adjacent ones of the plurality of second electrode sections form a third rectangular cell having a first corner, a second corner, a first side that is connected to the first corner and has a first gap, a second side connected to the first corner, a third side connected to the first side and the second corner and has a second gap, and a fourth side connected to the second side and the second corner, in plan view, the two adjacent ones of the plurality of second electrode sections form a fourth rectangular cell having a first corner, a second corner, a first side that is connected to the first corner of the fourth rectangular cell and has a first gap, a second side connected to the first corner of the fourth rectangular cell, a third side connected to the first side and the second corner of the fourth rectangular cell and has a second gap, and a fourth side connected to the second side and the second corner of the fourth rectangular cell, the second corner of the fourth rectangular cell overlapping the first corner of the third rectangular cell, in plan view, the third side of the third rectangular cell overlap the first gap of the first side of the first rectangular cell, in plan view, the fourth side of the third rectangular cell overlaps the second side of the first rectangular cell, in plan view, the first gap of the first side of the third rectangular cell overlaps the second gap of the third side of the second rectangular cell, in plan view, the second gap of the second side of the third rectangular cell overlaps the third side of the second rectangular cell, in plan view, the first gap of the first side of the fourth rectangular cell overlaps the second gap of the third side of the first rectangular cell, and in plan view, the second gap of the second side of the fourth rectangular cell overlaps the fourth side of the first rectangular cell.

9. The touch sensor of claim 8, wherein:
each of the plurality of first electrode sections includes:
   a first main line arranged in a zigzag manner along the first direction; and
   a plurality of first auxiliary lines branching off from each corner of the first main line in a direction intersecting the first direction and the second direction,
each of the plurality of reception electrodes includes a plurality of second electrode sections that are each formed of a wire, and
each of the plurality of second electrode sections includes:
   a second main line arranged in a zigzag manner along the second direction; and
   a plurality of second auxiliary lines branching off from each corner of the second main line in a direction intersecting the first direction and the second direction.

10. The touch sensor of claim 9, wherein:
the active area comprises a plurality of cell regions in plan view, each of the cell regions being unclosed,
each of the cell regions is surrounded by two or more wires selected from a group consisting of the first main line, the plurality of first auxiliary lines, the second main line, and the plurality of second auxiliary lines, at least one of the two or more wires is selected from wires of the plurality of first electrode sections, and at least one of the two or more wires is selected from wires of the plurality of second electrode sections, and
each of the first, second, third and fourth rectangular cells includes four cell regions.

* * * * *